US 12,445,489 B2

(12) United States Patent
Das et al.

(10) Patent No.: US 12,445,489 B2
(45) Date of Patent: Oct. 14, 2025

(54) MAC ADDRESS CLONING ATTACK DETECTION FOR V2X DEVICES

(71) Applicant: QUALCOMM Incorporated, San Diego, CA (US)

(72) Inventors: Soumya Das, San Diego, CA (US); Gabi Sarkis, San Diego, CA (US); Mohammad Nekoui, San Diego, CA (US); Jonathan Petit, Wenham, MA (US)

(73) Assignee: QUALCOMM Incorporated, San Diego, CA (US)

( * ) Notice: Subject to any disclaimer, the term of this patent is extended or adjusted under 35 U.S.C. 154(b) by 286 days.

(21) Appl. No.: 18/316,025

(22) Filed: May 11, 2023

(65) Prior Publication Data

US 2024/0380782 A1  Nov. 14, 2024

(51) Int. Cl.
*H04L 29/06* (2006.01)
*G06F 1/20* (2006.01)
*H04L 9/40* (2022.01)

(52) U.S. Cl.
CPC .......... *H04L 63/1483* (2013.01); *G06F 1/206* (2013.01)

(58) Field of Classification Search
CPC .................. H04L 63/1483; G06F 21/563
See application file for complete search history.

(56) References Cited

U.S. PATENT DOCUMENTS

| 2014/0286328 | A1 | 9/2014 | Elgarisi |
| 2020/0280568 | A1* | 9/2020 | Bratspiess ........... H04L 63/1433 |
| 2021/0352679 | A1* | 11/2021 | Baghel .................... H04W 4/40 |
| 2022/0086730 | A1 | 3/2022 | Park |
| 2024/0260126 | A1* | 8/2024 | Park ...................... H04W 76/14 |

OTHER PUBLICATIONS

International Search Report and Written Opinion—PCT/US2024/026641—ISA/EPO—Aug. 8, 2024.

* cited by examiner

*Primary Examiner* — Jeffrey C Pwu
*Assistant Examiner* — Thong P Truong
(74) *Attorney, Agent, or Firm* — Procopio, Cory, Hargreaves & Savitch

(57) ABSTRACT

A method of wireless communication at a first V2X device is described herein. The method includes obtaining a message including a MAC header, an L1 source ID, and an L1 destination ID. The method includes decoding the MAC header to produce an L2 source ID associated with the message based on at least one of (1) the L1 destination ID of the message matching a first number of bits of an L2 source ID of the first V2X device or (2) the L1 source ID of the message matching a second number of bits of the L2 source ID of the first V2X device. The method includes outputting an indication of a MAC cloning attack based on the L2 source ID of the message matching the L2 source ID of the first V2X device.

29 Claims, 17 Drawing Sheets

MAC ADDRESS CLONING ATTACK DETECTION FOR V2X DEVICES

TECHNICAL FIELD

The present disclosure relates generally to communication systems, and more particularly, to medium access control (MAC) cloning attack detection.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication at a first vehicle-to-everything (V2X) device are provided. The apparatus includes a memory; and a processor coupled to the memory and, based on information stored in the memory, the processor is configured to obtain a message including a medium access control (MAC) header, a layer 1 (L1) source identifier (ID), and an L1 destination ID; decode the MAC header to produce a layer 2 (L2) source ID associated with the message based on at least one of (1) the L1 destination ID of the message matching a first number of bits of an L2 source ID of the first V2X device or (2) the L1 source ID of the message matching a second number of bits of the L2 source ID of the first V2X device; and output an indication of a MAC cloning attack based on the L2 source ID of the message matching the L2 source ID of the first V2X device.

In an aspect of the disclosure, a method, a computer-readable medium, and an apparatus for wireless communication at a first vehicle-to-everything (V2X) device are provided. The apparatus includes a memory; and a processor coupled to the memory and, based on information stored in the memory, the processor is configured to detect that a medium access control (MAC) cloning attack has occurred based on a layer 1 (L1) destination identifier (ID) of a second V2X device, an L1 source ID of the first V2X device, and a layer 2 (L2) source ID of a first message; and transmit, for the second V2X device based on the detection, a second message that indicates a MAC cloning attack and that includes the L1 destination ID of the second V2X device, the L1 source ID of the first V2X device, and the L2 source ID of the first message.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
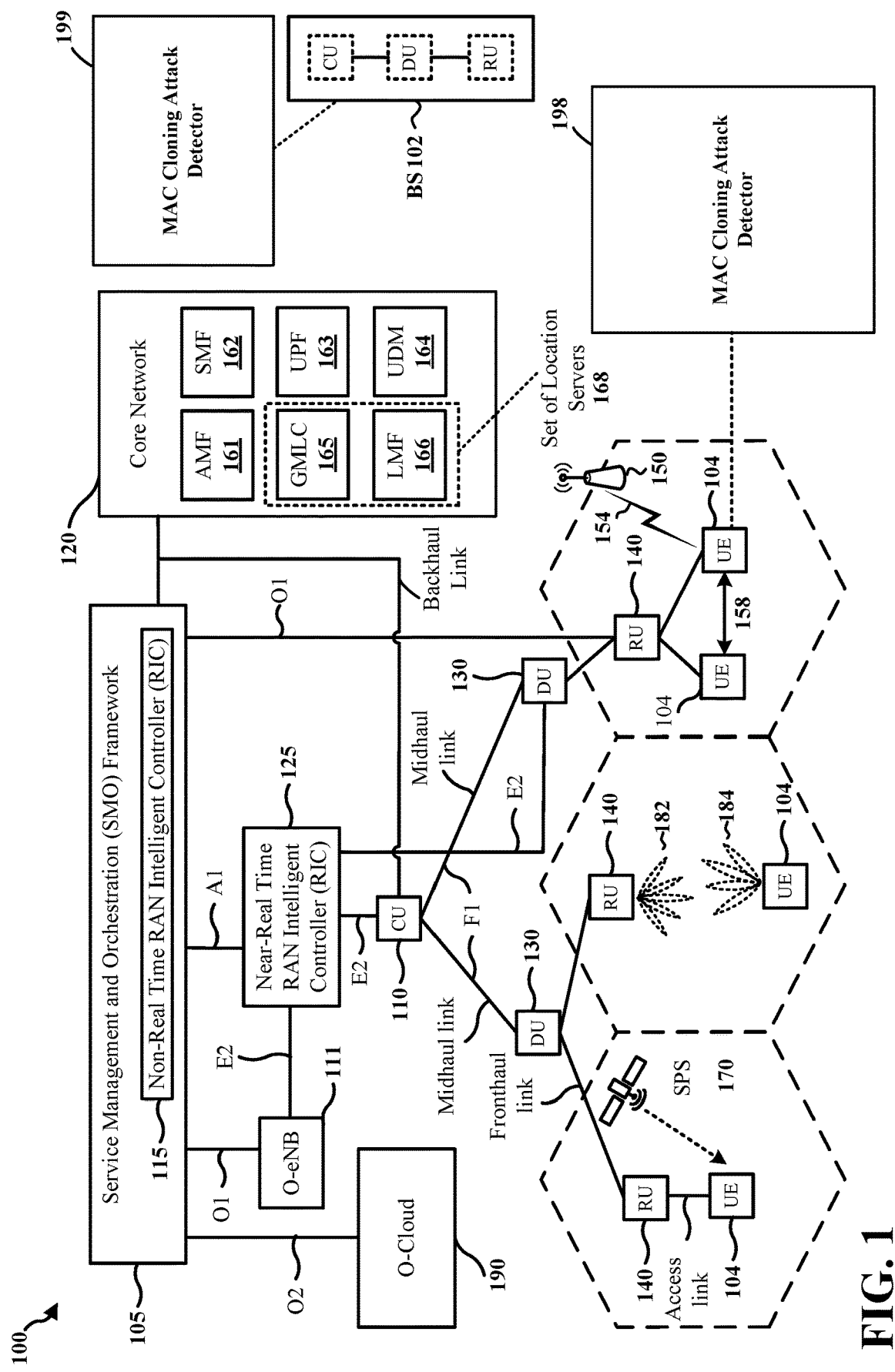
FIG. 1 is a diagram illustrating an example of a wireless communications system and an access network.

A sidelink medium access control (MAC) cloning attack may occur when an attacking device clones (i.e., copies) a source Layer 2 (L2) address of a victim device (e.g., a victim on-board unit (OBU), a victim road side unit (RSU), etc.) and uses the cloned source L2 address of the victim device to transmit messages that appear to be from the victim device, but are in fact from the attacking device. A receiving (Rx) UE may utilize misbehavior detection schemes to identify a sidelink MAC cloning attack (or another type of MAC cloning attack). The Rx UE may order lower protocol layers (e.g., L1) to filter incoming packets from the (cloned) source L2 address. However, such misbehavior detection schemes may cause an Rx UE to filter (legitimate) packets from the victim device (e.g., the victim OBU, the victim RSU, etc.) as well. Furthermore, for a unicast transmission, if an L1 destination identifier (ID) of a transmission does not match an L1 destination ID of a transmitting (Tx) UE, the Tx UE may not decode transmissions from an attacking device, except for retrieving an L1 source ID (i.e., an L1 source address) and an L1 destination ID from a sidelink control information (SCI-2)-transmission (e.g., a SCI-2 transmission). As a result, the Tx UE may not be able to detect that the attacking device has cloned the L2 source ID of the Tx UE, that is, the Tx UE may not be able to detect that a MAC cloning attack has occurred.

Various aspects disclosed herein generally relate to MAC address cloning attack detection. Some aspects described herein more specifically relate to transmitter-side MAC address cloning attack detection for V2X and receiver-side MAC address cloning attack detection for V2X. In an example, a first V2X device (e.g., a Tx V2X device) obtains a message including a MAC header, an L1 source ID, and an L1 destination ID. The first V2X device decodes the MAC header to produce an L2 source ID associated with the message based on at least one of (1) the L1 destination ID of the message matching a first number of bits of an L2 source ID of the first V2X device or (2) the L1 source ID of the message matching a second number of bits of the L2 source ID of the first V2X device. The first V2X device outputs an indication of a MAC cloning attack based on the L2 source ID of the message matching the L2 source ID of the first V2X device.

Particular aspects of the subject matter described in this disclosure can be implemented to realize one or more of the following potential advantages. In some examples, by decoding the MAC header to produce an L2 source ID associated with the message based on at least one of (1) the L1 destination ID of the message matching a first number of bits of an L2 source ID of the first V2X device or (2) the L1 source ID of the message matching a second number of bits of the L2 source ID of the first V2X device, an ability of the V2X device to detect a MAC cloning attack may be increased compared to a V2X device that decodes a MAC header if an L1 destination ID of a message matches a first number of bits of an L2 source ID of the first V2X device.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)).

In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (0-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a MAC cloning attack detector 198 that may be configured to obtain a message including a MAC header, an L1 source ID, and an L1 destination ID; decode the MAC header to produce an L2 source ID associated with the message based on at least one of (1) the L1 destination ID of the message matching a first number of bits of an L2 source ID of the first V2X device or (2) the L1 source ID of the message matching a second number of bits of the L2 source ID of the first V2X device; and output an indication of a MAC cloning attack based on the L2 source ID of the message matching the L2 source ID of the first V2X device. In certain aspects, the MAC cloning attack detector 198 may be configured to detect that a MAC cloning attack has occurred based on an L1 destination ID of a second V2X device, an L1 source ID of the first V2X device, and an L2 source ID of a first message; and transmit, for the second V2X device based on the detection, a second message that indicates a MAC cloning attack and that includes the L1 destination ID of the second V2X device, the L1 source ID of the first V2X device, and the L2 source ID of the first message. In certain aspects, the base station 102 may have a MAC cloning attack detector 199 that may be configured to obtain a message including a MAC header, an L1 source ID, and an L1 destination ID; decode the MAC header to produce an L2 source ID associated with the message based on at least one of (1) the L1 destination ID of the message matching a first number of bits of an L2 source ID of the first V2X device or (2) the L1 source ID of the message matching a second number of bits of the L2 source ID of the first V2X device; and output an indication of a MAC cloning attack based on the L2 source ID of the message matching the L2 source ID of the first V2X device. In certain aspects, the MAC cloning attack detector 199 may be configured to detect that a MAC cloning attack has occurred based on an L1 destination ID of a second V2X device, an L1 source ID of the first V2X device, and an L2 source ID of a first message; and transmit, for the second V2X device based on the detection, a second message that indicates a MAC cloning attack and that includes the L1 destination ID of the second V2X device, the L1 source ID of the first V2X device, and the L2 source ID of the first message.

Figure 2:
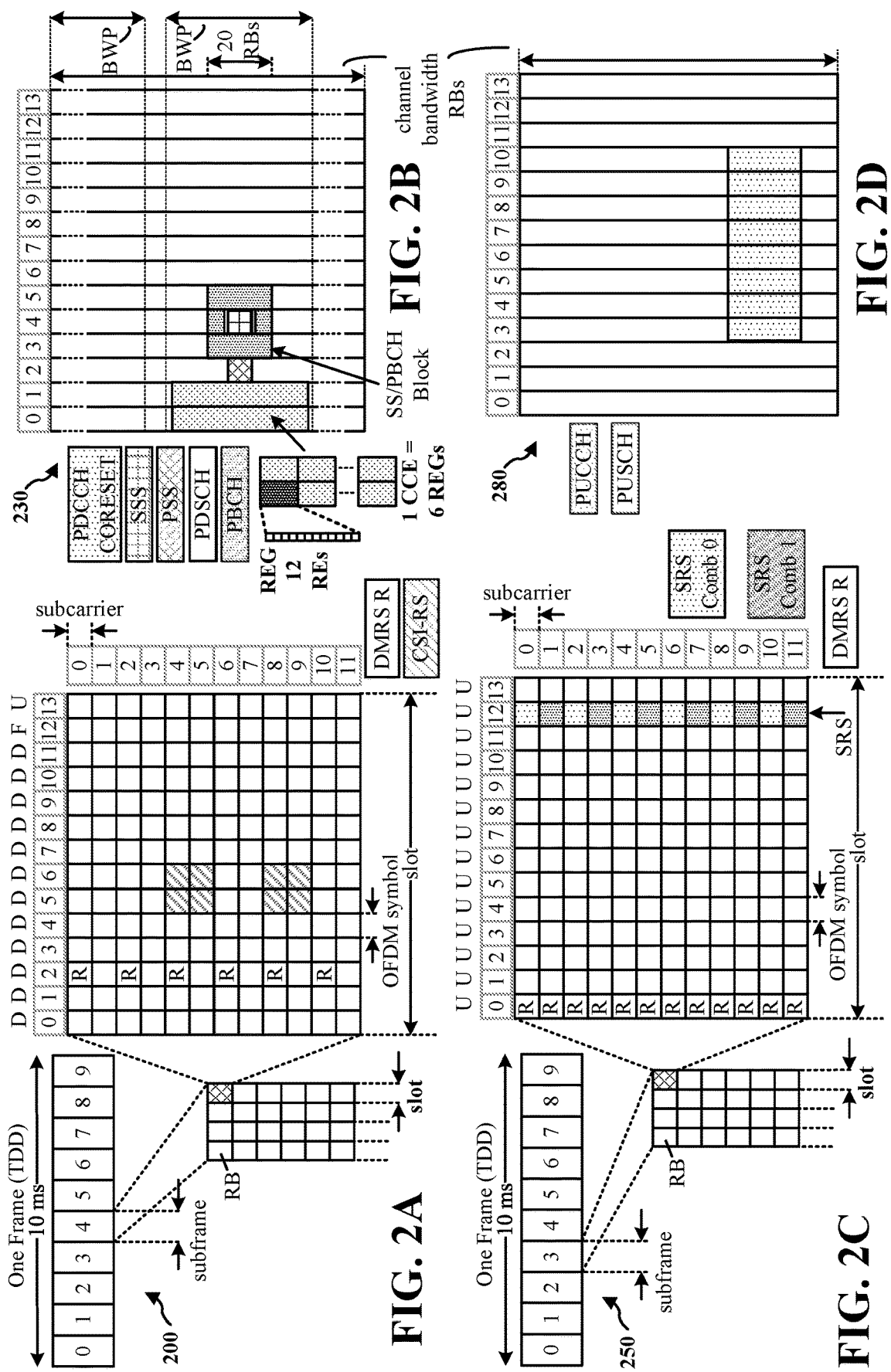
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS

TABLE 1

Numerology, SCS, and CP

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 2 slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology p=4 has a subcarrier spacing of 240 kHz. The symbol length/duration is inversely related to the subcarrier spacing. FIGS. 2A-2D provide an example of normal CP with 14 symbols per slot and numerology p=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
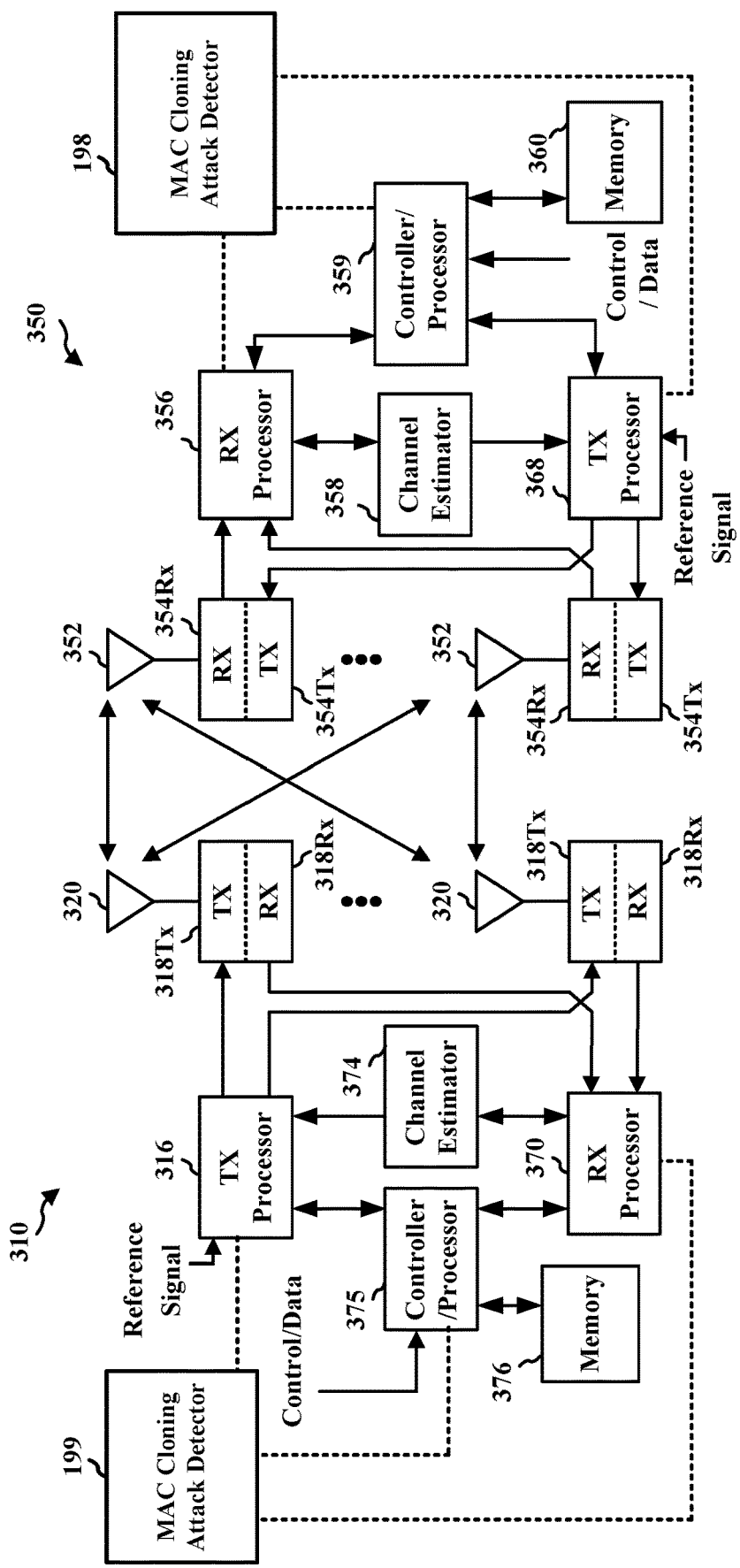
FIG. 3 is a diagram illustrating an example of a base station and user equipment (UE) in an access network in accordance with various aspects of the present disclosure.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the MAC cloning attack detector 198 of FIG. 1.

At least one of the TX processor 316, the RX processor 370, and the controller/processor 375 may be configured to perform aspects in connection with the MAC cloning attack detector 199 of FIG. 1.

Figure 4:
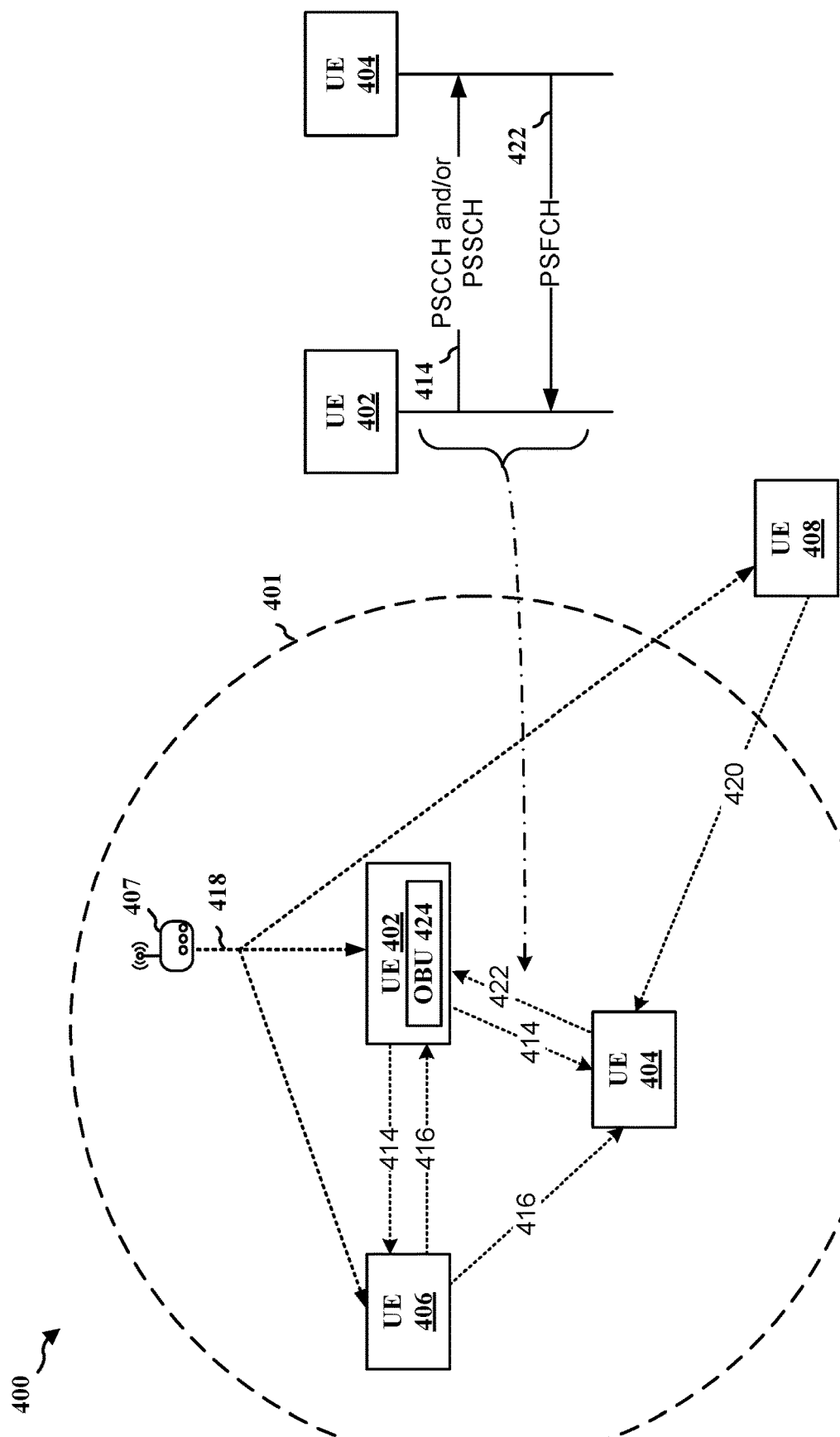
FIG. 4 is a diagram illustrating an example of wireless communication between wireless devices based on sidelink (SL) communication in accordance with various aspects of the present disclosure.

FIG. 4 is a diagram 400 illustrating an example of wireless communication between wireless devices based on sidelink (SL) communication in accordance with various aspects of the present disclosure. In one example, a UE 402 may transmit a transmission 414, e.g., including a control channel (e.g., a physical sidelink control channel (PSCCH)) and a corresponding data channel (e.g., a physical sidelink shared channel (PSSCH)), that may be received by one or more UEs (e.g., UEs 404 and 406). A control channel may include information for decoding the corresponding data channel, and it may also be used by a receiving UE for avoiding interference (e.g., UEs 404 and 406 may be refrained from transmitting data on resources occupied/ reserved by the UE 402). For example, the UE 402 may indicate the number of transmission time intervals (TTIs) and the resource blocks (RBs) that are to be occupied by a transmission from the UE 402 in a control message (e.g., a sidelink control information (SCI) message). The UEs 402, 404, 406, and 408 may each have the capability to operate as a transmitting UE in addition to operating as a receiving UE. For example, UEs 404, 406, and 408 may also transmit transmissions 422, 416, and 420, respectively, to other UEs, such as the UEs 402 and 404. The transmissions 414, 416, 420 may be broadcast or multicast to nearby wireless devices or UEs. For example, the UE 402 may transmit communication (e.g., data) for receipt by other UEs within a range 401 of the UE 402. Additionally, or alternatively, a road side unit (RSU) 407 may be used to provide connectivity and information to sidelink devices, such as by receiving communication from and/or transmitting communication (e.g., communication 418) to UEs 402, 406, and 408.

Sidelink communication that is exchanged directly between UEs (which may be referred to as "sidelink UEs" hereafter) may include discovery messages for a UE to find other nearby UEs. In some examples, the sidelink communication may also include resource reservation information associated with other sidelink UEs, which may be used by a UE for determining/selecting the resources for transmission.

The UE 402 may include an on-board unit (OBU) 424. The OBU 424 may be a device in a vehicle that may be used to transmit and collect data for various applications. The OBU 424 may record traffic and driving data and connect to roadside and satellite navigation systems. The OBU 424 may be used for diagnostic and emergency data storage, route planning, navigation, vehicle-to-vehicle (V2V) communication, vehicle-to-infrastructure (V2I) communication, and vehicle-to-roadside (V2R) communication.

Figure 5:
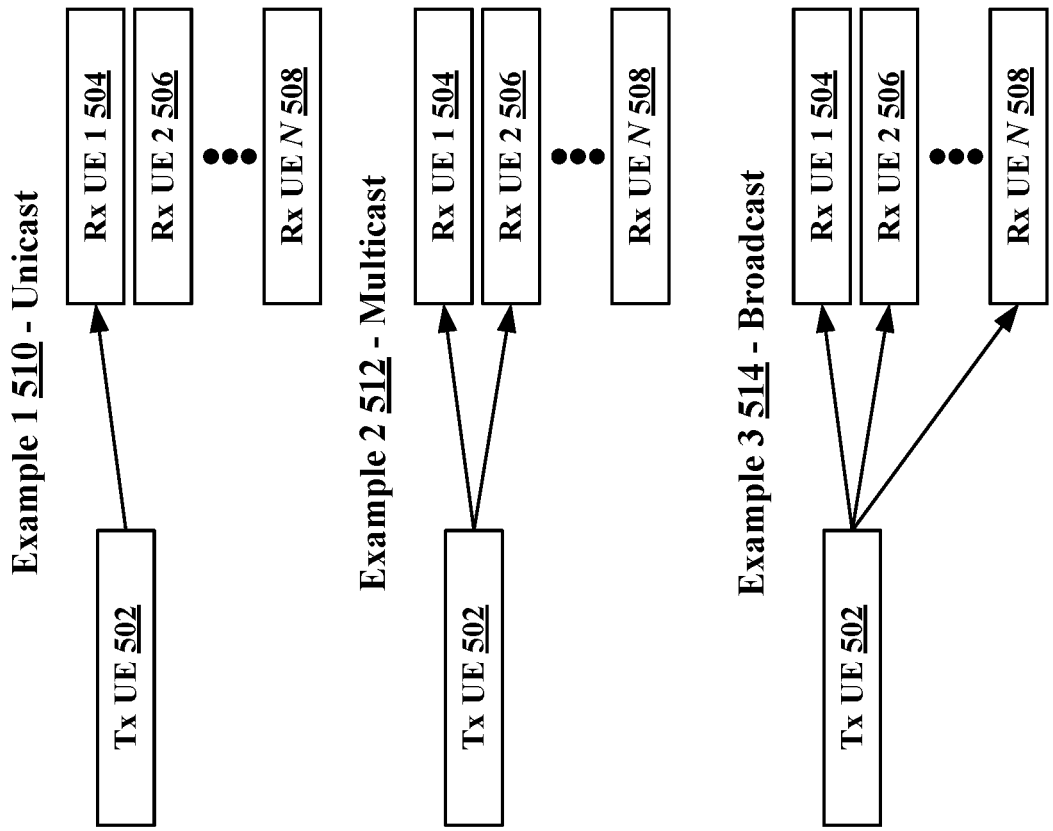
FIG. 5 is a diagram illustrating example communications between a transmitting (Tx) UE and one or more receiving (Rx) UEs in accordance with various aspects of the present disclosure.

FIG. 5 is a diagram 500 illustrating example communications between a Tx UE and one or more Rx UEs in accordance with various aspects of the present disclosure. The diagram 500 depicts a Tx UE 502, a first Rx UE 504, a second Rx UE 506, and an Nth Rx UE 508, where N is a positive integer greater than two. The first Rx UE 504, the second Rx UE 506, and the Nth Rx UE 508 may be collectively referred to as a plurality of Rx UEs 504-508.

In a first example 510, the Tx UE 502 may communicate with an Rx UE by transmitting message(s) during a unicast session. For instance, during a unicast session with the first Rx UE 504, the Tx UE 502 may transmit message(s) to the first Rx UE 504. During the unicast session with the first Rx UE 504, the Tx UE 502 may not transmit messages to other UEs (e.g., the second Rx UE 506, the Nth Rx UE 508, etc.).

In a second example 512, the Tx UE 502 may communicate with a group of Rx UEs by transmitting message(s) during a multicast session, where the group of Rx UEs may be a subset of the plurality of Rx UEs 504-508. For instance, during a multicast session with the first Rx UE 504 and the second Rx UE 506, the Tx UE 502 may transmit message(s) to the first Rx UE 504 and the second Rx UE 506. During the multicast session with the first Rx UE 504 and the second Rx UE 506, the Tx UE 502 may not transmit messages to UEs (e.g., the Nth Rx UE 508) that are not included in the multicast session. A multicast session may also be referred to as a groupcast session.

In a third example 514, the Tx UE 502 may communicate with UEs (e.g., the plurality of Rx UEs 504-508) within range of the Tx UE 502. For instance, during a broadcast session, the Tx UE 502 may transmit message(s) for the first Rx UE 504, the second Rx UE 506, and the Nth Rx UE 508. The message(s) transmitted during the broadcast session may not be for a specific UE; rather, the message(s) may be for some or all UEs within range of the Tx UE 502.

A sidelink MAC cloning attack (i.e., a sidelink layer 2 (L2) cloning attack) may occur when an attacking device clones (i.e., copies) a source L2 address of a victim device (e.g., a victim OBU, a victim road side unit (RSU), etc.) and uses the cloned source L2 address of the victim device to transmit messages that appear to be from the victim device, but are in fact from the attacking device. An Rx UE may utilize misbehavior detection schemes to identify a sidelink MAC cloning attack (or another type of MAC cloning attack). The Rx UE may order lower protocol layers (e.g., layer 1 (L1)) to filter incoming packets from the (cloned) source L2 address. However, such misbehavior detection schemes may cause an Rx UE to filter (legitimate) packets from the victim device (e.g., the victim OBU, the victim RSU, etc.) as well.

Figure 6:
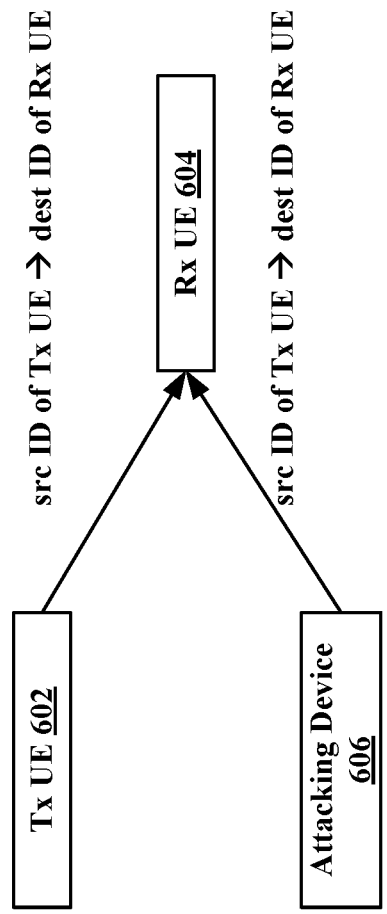
FIG. 6 is a diagram illustrating an example medium access control (MAC) cloning attack in accordance with various aspects of the present disclosure.

FIG. 6 is a diagram 600 illustrating an example MAC cloning attack in accordance with various aspects of the present disclosure. The diagram 600 depicts a Tx UE 602, an Rx UE 604, and an attacking device 606. In a MAC cloning attack (e.g., a sidelink MAC cloning attack), the attacking device 606 may copy an L2 source ID of the Tx UE 602 and the attacking device 606 may use the copied L2 source ID of the Tx UE 602 to communicate with the Rx UE 604.

In some wireless communication schemes, the Tx UE 602 may not decode a transmission beyond a SCI-1 transmission and/or a SCI-2 transmission unless the transmission (i.e., a message) has a matching L1 destination ID (i.e., a matching L1 destination address). For instance, for a unicast transmission, if the L1 destination ID of a transmission does not match an L1 destination ID of the Tx UE 602, the Tx UE 602 may not decode transmissions from the attacking device 606, except for retrieving an L1 source ID (i.e., an L1 source address) and an L1 destination ID from a SCI-2 transmission. As a result, the Tx UE 602 may not be able to detect that the attacking device 606 has cloned the L2 source ID of the Tx UE 602, that is, the Tx UE 602 may not be able to detect that a MAC cloning attack has occurred. An L1 source ID (e.g., an L1 source ID of the Tx UE 602) of a device may be the 8 least significant bits (LSBs) of the L2 source ID of the device. The L2 source ID of the device may be 24 bits. An L1 destination ID (e.g., an L1 destination ID of the Rx UE 604) of a device may be the 16 LSBs of the L2 destination ID of the device. The L2 destination ID of the device may be 24 bits. The aforementioned behavior may not be applicable to multicast and/or groupcast transmissions, as an L2 destination ID (i.e., an L2 destination address) may be service-specific and tied to a physical service ID (PSID). Thus, multicast and/or groupcast transmissions may not be tied to a specific Rx UE (e.g., the Rx UE 604).

A sidelink MAC cloning attack may occur when an attacking device clones (i.e., copies) a source L2 address of a victim device (e.g., a victim OBU, a victim road side unit (RSU), etc.) and uses the cloned source L2 address of the victim device to transmit messages that appear to be from the victim device, but are in fact from the attacking device. An Rx UE may utilize misbehavior detection schemes to identify a sidelink MAC cloning attack (or another type of MAC cloning attack). The Rx UE may order lower protocol layers (e.g., L1) to filter incoming packets from the (cloned) source L2 address. However, such misbehavior detection schemes may cause an Rx UE to filter (legitimate) packets from the victim device (e.g., the victim OBU, the victim RSU, etc.) as well. Furthermore, for a unicast transmission, if an L1 destination ID of a transmission does not match an L1 destination ID of a TX UE, the Tx UE may not decode transmissions from an attacking device, except for retrieving an L1 source ID (i.e., an L1 source address) and an L1 destination ID from a SCI-2 transmission. As a result, the Tx UE may not be able to detect that the attacking device has cloned the L2 source ID of the Tx UE, that is, the Tx UE may not be able to detect that a MAC cloning attack has occurred.

Various technologies pertaining to MAC address cloning attack detection for V2X are described herein. In an example, a first V2X device (e.g., a Tx V2X device) obtains a message including a MAC header, an L1 source ID, and an L1 destination ID. The first V2X device decodes the MAC header to produce an L2 source ID associated with the message based on at least one of (1) the L1 destination ID of the message matching a first number of bits of an L2 source ID of the first V2X device or (2) the L1 source ID of the message matching a second number of bits of the L2 source ID of the first V2X device. The first V2X device outputs an indication of a MAC cloning attack based on the L2 source ID of the message matching the L2 source ID of the first V2X device. Vis-à-vis decoding the MAC header to produce an L2 source ID associated with the message based on at least one of (1) the L1 destination ID of the message matching a first number of bits of an L2 source ID of the first V2X device or (2) the L1 source ID of the message matching a second number of bits of the L2 source ID of the first V2X device, an ability of the V2X device to detect a MAC cloning attack may be increased compared to a V2X device that decodes a MAC header if an L1 destination ID of a message matches a first number of bits of an L2 source ID of the first V2X device.

An attacker may clone an OBU/RSU's source L2 address and use the cloned address to transmit its own messages. Misbehavior detection schemes may be available to identify such a cloning attack, but such misbehavior detection schemes involve ordering a lower layer to filter any incoming packets from an L2 address of the victim, affecting the victim as well. In one aspect, a transmitter may detect cloning. For instance, when a source L1 ID of a received packet matches the transmitter's own source L1 ID, the transmitter may then check the MAC header even if the packet was not destined for the transmitter. Thus, the transmitter may detect if a cloning of a source L2 ID has occurred (i.e., the transmitter detects its own source L2 ID). In some aspects, constraints on this check may be implemented to reduce computational overhead, such as waiting for thermal triggers or waiting for an indication from another device (e.g., an RSU). In one aspect, a receiver may detect cloning. For instance, when a cloning attack is detected, the receiver may notify the transmitter of the cloning attack. For instance, inter-UE coordination (IUC) messages may be used to notify the transmitter of the cloning attack. Otherwise, an application layer message may be used to convey the cloning attack. To avoid a risk of a receiver reporting a fake cloning attack, a majority voting algorithm may be utilized by the transmitter.

Figure 7:
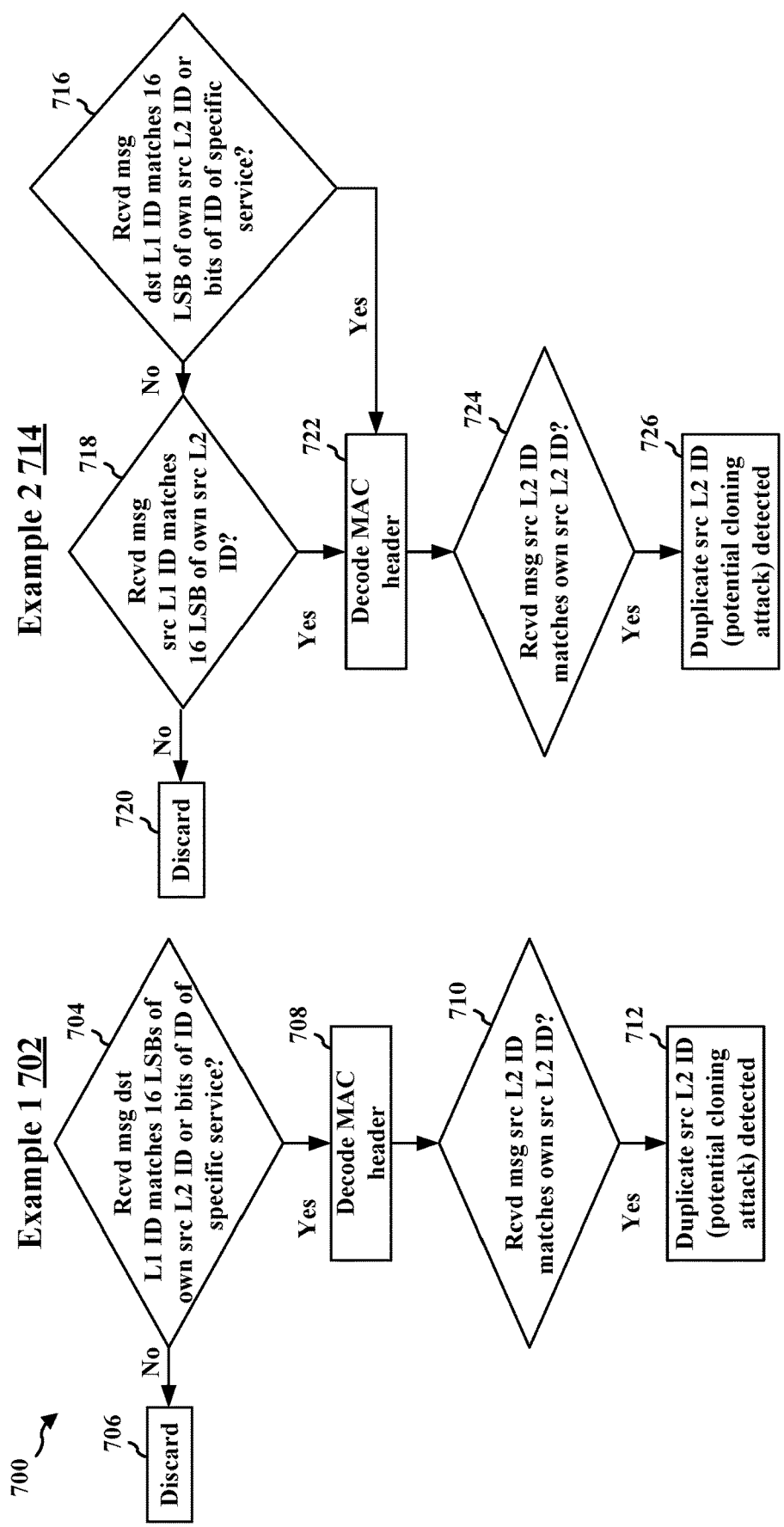
FIG. 7 is a diagram illustrating examples of a Tx UE detecting a MAC cloning attack in accordance with various aspects of the present disclosure.

FIG. 7 is a diagram 700 illustrating examples of a Tx UE detecting a MAC cloning attack in accordance with various aspects of the present disclosure. In an example, the Tx UE may be the Tx UE 502 or the Tx UE 602. The diagram 700 may be associated with Tx-based detection of MAC cloning attacks for unicast transmissions.

In a first example 702, the Tx UE may receive a message (i.e., a transmission, packet(s), etc.). At 704, the Tx UE may determine whether an L1 destination ID in the message matches the 16 least significant bits (LSBs) of an L2 source ID of the Tx UE. An LSB may refer to a least weighted bit of a binary number. In an example, the LSB of a binary number "10" is "0." In another example, the 2 LSBs of the binary number "100" are "00." Additionally, or alternatively, at 704, the Tx UE may determine whether the L1 destination ID in the message matches bits associated with a specific service (e.g., bits associated with a physical service ID (PSID)). At 706, if the L1 destination ID in the message does not match the 16 LSBs of the L2 source ID of the Tx UE (or does not match the bits associated with the specific service), the Tx UE may discard the message. At 708, if the L1 destination ID in the message matches the 16 LSBs of the L2 source ID of the Tx UE (or matches the bits associated with the specific service), at 708, the Tx UE may decode a MAC header of the message in order to obtain an L2 source ID from the message. At 710, the Tx UE may determine whether the L2 source ID from the message matches an L2 source ID of the Tx UE. At 712, if the L2 source ID from the message matches an L2 source ID of the Tx UE, a potential MAC cloning attack may be detected by the Tx UE.

In a second example 714, when an L1 source ID of a message (i.e., a transmission, packet(s), etc.) matches an L1 source ID of a Tx UE, the Tx UE may perform additional processing to decode a MAC header of the message even if the message is not destined for the Tx UE. For instance, the message may not be destined for the Tx UE if the L1 destination ID of the message matches the 16 LSBs of the L2 source ID of the Tx UE. After decoding the MAC header, the Tx UE may check if a cloning of an L2 source ID of the Tx UE has occurred (i.e., the Tx UE may check if a MAC cloning attack has occurred).

In the second example 714, the Tx UE may receive a message. At 716, the Tx UE may determine whether an L1 destination ID in the message matches the 16 LSBs of an L2 source ID of the Tx UE. Additionally, or alternatively, at 716, the Tx UE may determine whether the L1 destination ID in the message matches bits associated with a specific service (e.g., bits associated with a PSID). At 718, if the L1 destination ID in the message does not match the 16 LSBs of an L2 source ID of the Tx UE (or does not match the bits associated with the specific service), the UE may determine whether an L1 source ID of the message matches the 16 LSBs of an L2 source ID of the Tx UE. At 720, if the L1 source ID of the message matches the 16 LSBs of an L2 source ID of the Tx UE, the Tx UE may discard the message.

At 722, if the L1 destination ID in the message matches the 16 LSBs of the L2 source ID of the Tx UE or if the L1 source ID of the message matches the 16 LSBs of the L2 source ID of the Tx UE, the Tx UE may decode a MAC header of the message to obtain an L2 source ID of the message. At 724, the Tx UE may determine whether the L2 source ID of the message matches an L2 source ID of the Tx UE. At 726, if the L2 source ID from the message matches an L2 source ID of the Tx UE, a potential MAC cloning attack may be detected by the Tx UE. The Tx UE may perform various actions upon detecting that a potential MAC cloning attack has occurred. For instance, the Tx UE may transmit, for the Rx UE and/or other UEs, an indication that the MAC cloning attack has occurred.

The second example 714 for detecting MAC cloning attacks may be associated with various advantages in comparison to the first example 702 for detecting MAC cloning attacks. For instance, in a MAC cloning attack, an attacking device may clone (i.e., copy) a source L2 ID of a Tx UE and the attacking device may use the cloned source L2 ID of the Tx UE to communicate with an Rx UE. In the first example 702, the Tx UE may discard a received message when an L1 destination ID of the received message does not match the 16 LSBs of the L2 source address of the Tx UE. As the Tx UE discards the received message without decoding a MAC header of the message, the Tx UE may not be able to identify an L2 source ID of the message. Thus, in the first example 702, the Tx UE may not be able to determine that a MAC cloning attack has occurred, as the Tx UE does not obtain the L2 source ID of the message if the L1 destination ID of the message does not match the 16 LSBs of the L2 source ID of the Tx UE. In contrast and in the second example 714, the Tx UE may decode the MAC header of the message (1) if the L1 destination ID of the received message matches the 16 LSBs of the L2 source ID of the Tx UE or (2) if the L1 source ID of the message matches the 16 LSBs of the L2 source ID of the Tx UE. Thus, the second example 714 may be associated with increased detection of MAC cloning attacks, as the Tx UE may check for MAC cloning attacks in messages that are not destined for the Tx UE.

Although L2 source ID cloning (i.e., MAC cloning) may not occur frequently, detecting L2 source ID cloning may increase computational overhead associated with decoding a message at a Tx UE. In one aspect, to reduce the aforementioned computational overhead, the Tx UE may perform a temperature measurement. If the temperature measurement is equal to or exceeds a threshold temperature, the Tx UE may not perform the processes described above in the second example 714. If the temperature measurement is less than the threshold temperature, the Tx UE may perform the processes described above in the second example 714. Thus, if a relatively high amount of computational processing is occurring at the Tx UE (as reflected in a temperature measurement meeting or exceeding the threshold temperature), the Tx UE may skip performing the processes described above with respect to the second example 714 in order to conserve computational resources of the Tx UE. In another aspect, the Tx UE may perform the processes described above with respect to the second example 714 upon receiving a trigger message from an RSU in order to conserve computational resources of the Tx UE.

Figure 8:
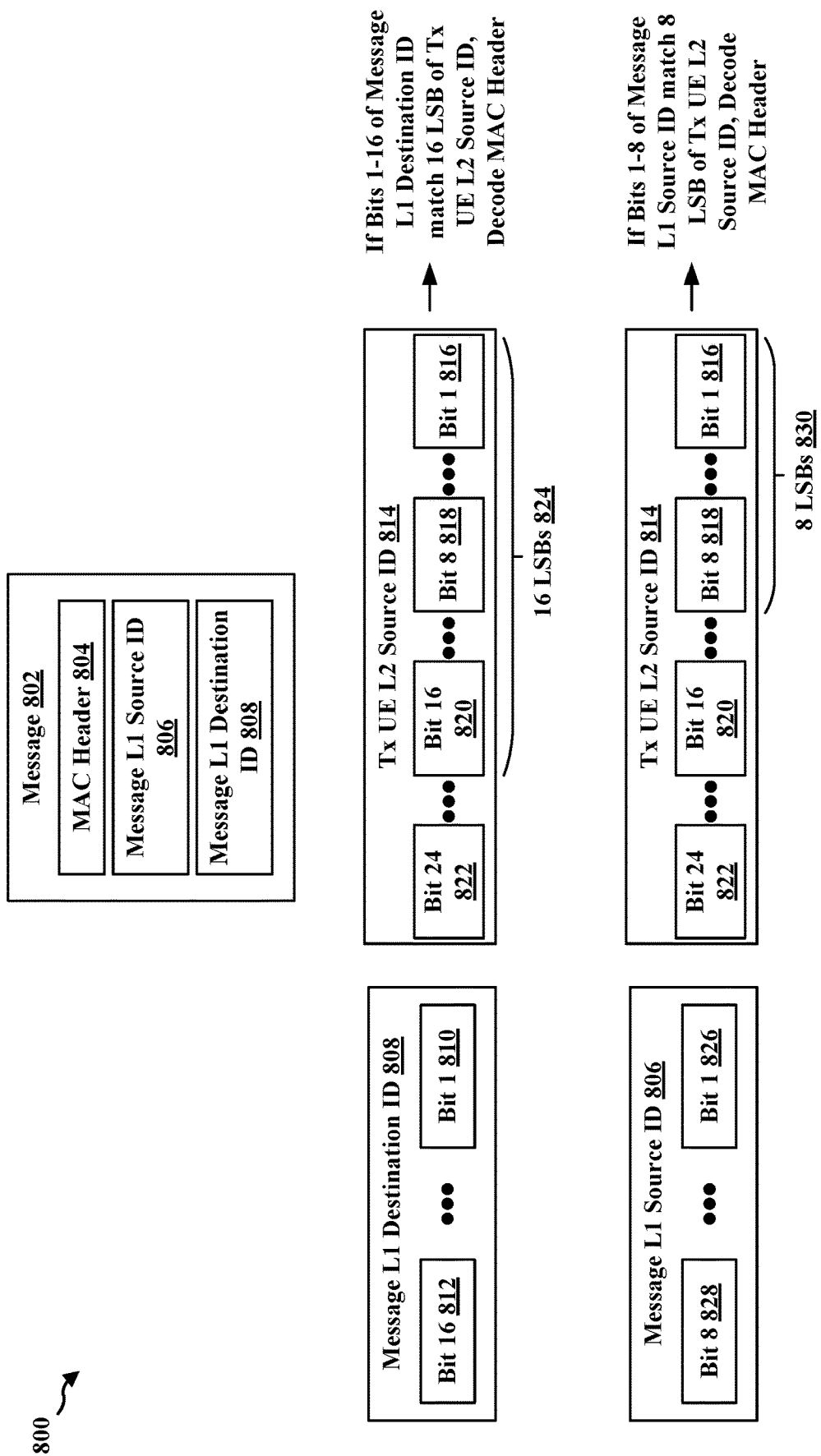
FIG. 8 is a diagram illustrating example aspects of a Tx UE detecting a MAC cloning attack in accordance with various aspects of the present disclosure.

FIG. 8 is a diagram 800 illustrating example aspects of a Tx UE detecting a MAC cloning attack in accordance with various aspects of the present disclosure. The diagram 800 depicts a message 802. The message 802 may correspond to the message received by the Tx UE in the first example 702 and/or the second example 714. The message 802 may include a MAC header 804, a message L1 source ID 806 (i.e., an L1 ID of a source device that sent the message), and a message L1 destination ID 808 (i.e., an L1 ID of a device for which the message is destined). The message 802 may also include data (not depicted in FIG. 8). The message L1 destination ID 808 may include 16 bits (represented in FIG. 8 as a first bit 810 ... and a sixteenth bit 812). The message L1 source ID 806 may include 8 bits (represented in FIG. 8 as a first bit 826 ... and an eighth bit 828).

The diagram 800 also depicts a Tx UE L2 source ID 814 of a Tx UE (e.g., the Tx UE 502, the Tx UE 602, etc.). The Tx UE L2 source ID 814 may include 24 bits (represented in FIG. 8 as a first bit 816 ... an eighth bit 818 ... a sixteenth bit 820 ... and a twenty-fourth bit 822). In an example, if the 16 bits of the message L1 destination ID 808 match the 16 LSBs 824 of the Tx UE L2 source ID 814, the Tx UE may decode the MAC header 804. The aforementioned example may correspond to 716 and 722 in the second example 714 of FIG. 7.

In another example, if the 8 bits of the message L1 source ID 806 match the 8 LSBs 830 of the Tx UE L2 source ID 814, the Tx UE may decode the MAC header 804. The aforementioned example may correspond to 718 and 722 in the second example 714 of FIG. 7.

Figure 9:
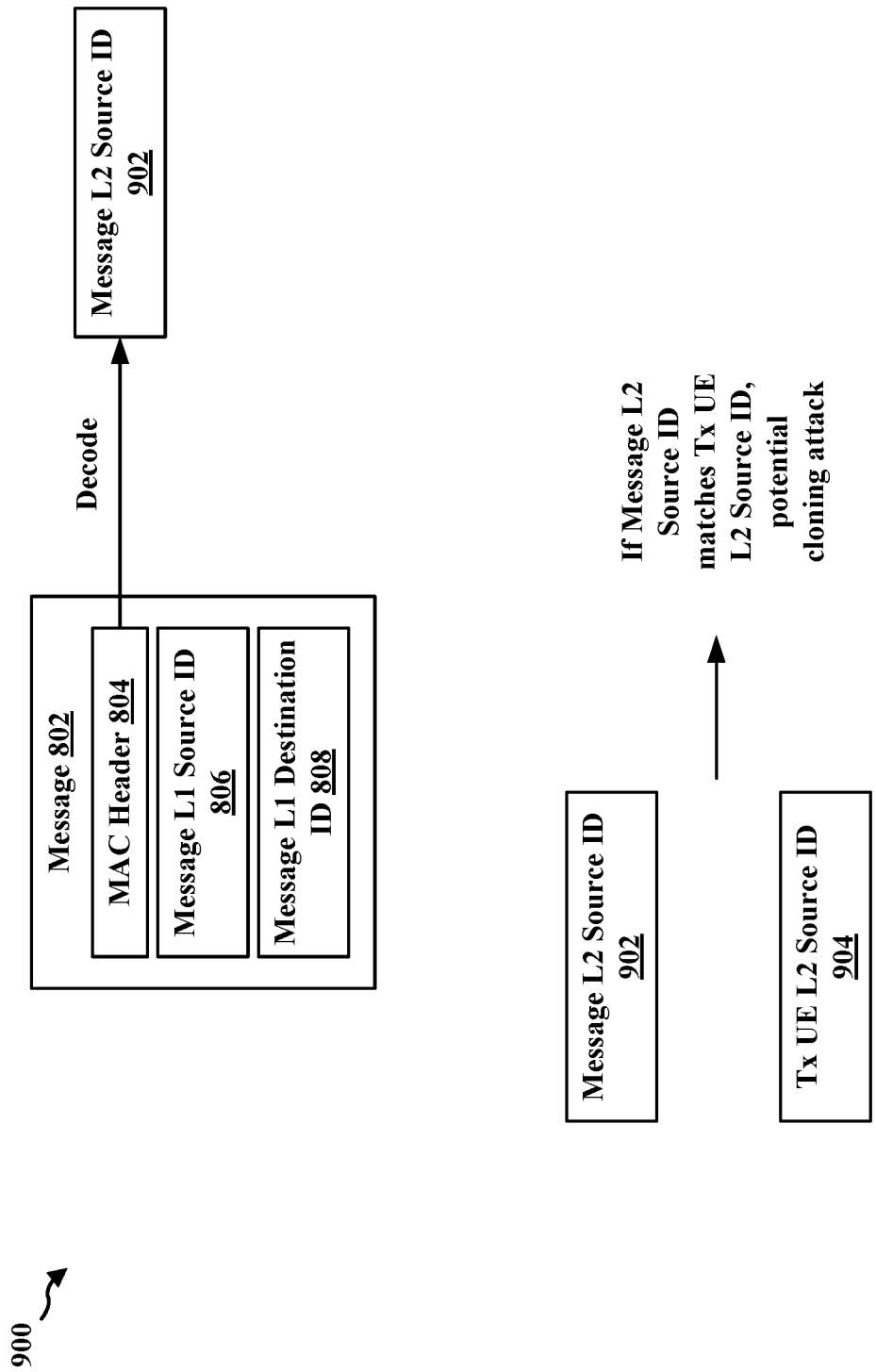
FIG. 9 is a diagram illustrating further example aspects of a Tx UE detecting a MAC cloning attack in accordance with various aspects of the present disclosure.

FIG. 9 is a diagram 900 illustrating further example aspects of a Tx UE detecting a MAC cloning attack in accordance with various aspects of the present disclosure. As discussed above in the description of FIG. 7 and FIG. 8, a Tx UE (e.g., the Tx UE 502, the Tx UE 602, etc.) may decode the MAC header 804 of the message if the 16 bits of the message L1 destination ID 808 match the 16 LSBs 824 of the Tx UE L2 source ID 814 or if the 8 bits of the message L1 source ID 806 match the 8 LSBs 830 of the Tx UE L2 source ID 814. Decoding the MAC header 804 may generate a message L2 source ID (i.e., a MAC address) of the message 802. Decoding the MAC header 804 may correspond to 722 in the second example 714 of FIG. 7.

In an example, the Tx UE may determine whether the message L2 source ID 902 matches a Tx UE L2 source ID 904 of the Tx UE. If the message L2 source ID 902 matches the Tx UE L2 source ID 904 of the Tx UE, the Tx UE may detect that a potential cloning attack (i.e., a MAC cloning attack) has occurred. If the message L2 source ID 902 does not match the Tx UE L2 source ID 904 of the Tx UE, the Tx UE may detect that a cloning attack has not occurred. The aforementioned example may correspond to 726 in the second example 714 of FIG. 7.

Figure 10:
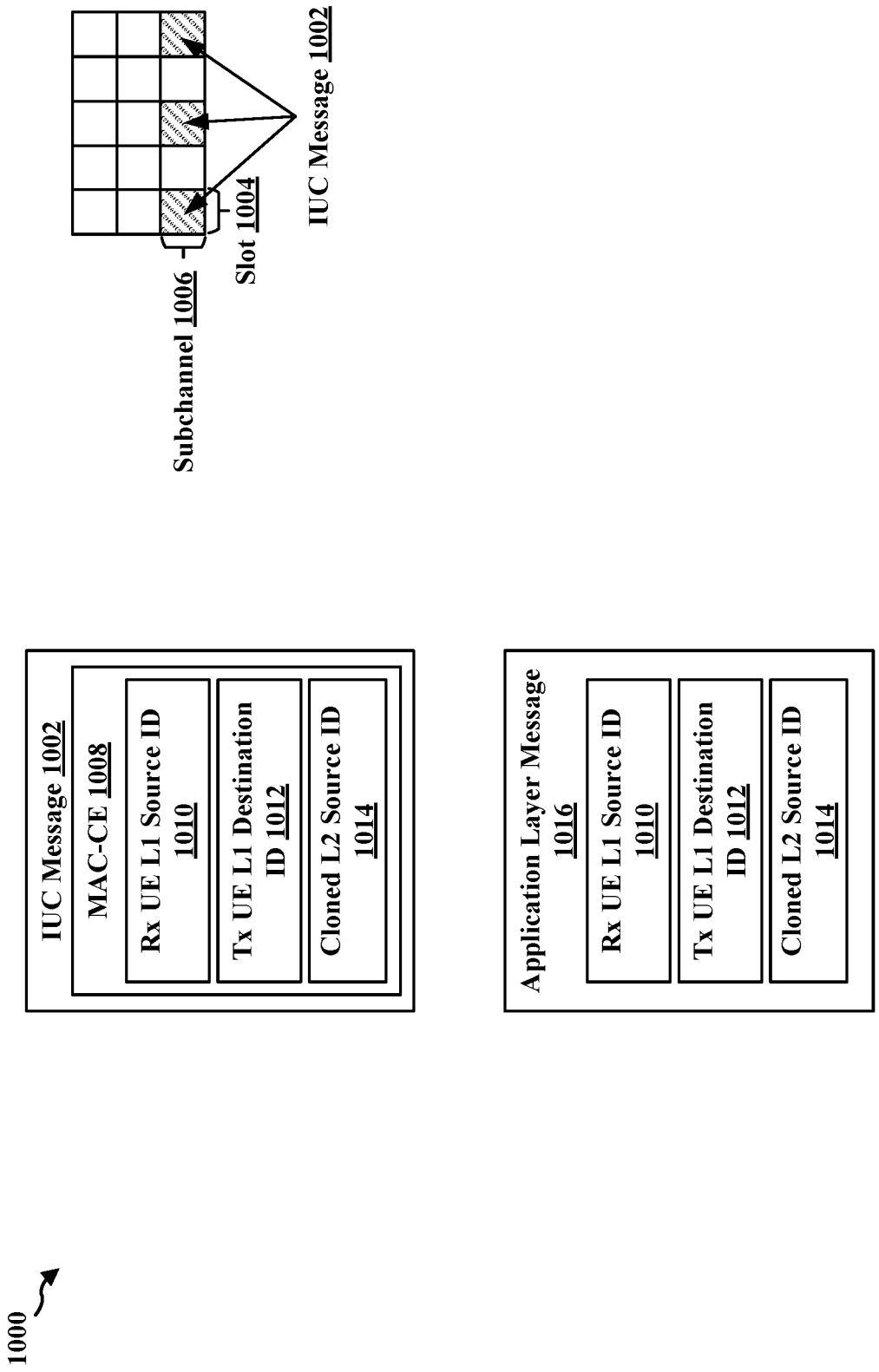
FIG. 10 is a diagram illustrating example aspects of an Rx UE informing a Tx UE of a MAC cloning attack in accordance with various aspects of the present disclosure.

FIG. 10 is a diagram 1000 illustrating example aspects of an Rx UE informing a Tx UE of a MAC cloning attack in accordance with various aspects of the present disclosure. An Rx UE (e.g., the first Rx UE 504) may be able to detect a MAC cloning attack performed on a Tx UE by an attacking device. For instance, the Rx UE may be able to detect the MAC cloning attack based on a (matching) L1 destination ID and through information provided by an intelligent transport systems (ITS) stack (e.g., certificate check, etc.). In one aspect, the Rx UE may notify the Tx UE of a MAC cloning attacked performed on the Tx UE. For instance, the RX UE may notify the Tx UE of the MAC cloning attack when the Tx UE is unable to detect the MAC cloning attack.

The diagram 1000 depicts an inter-UE coordination (IUC) message 1002. An Rx UE (e.g., the first Rx UE 504) may transmit the IUC message 1002 to/for a Tx UE to notify the Tx UE of a MAC cloning attack performed on the Tx UE based on the RX UE detecting the MAC cloning attack performed on the Tx UE. The IUC message 1002 may be transmitted in every other slot 1004 on a subchannel 1006 on a contention-based basis. For example, the IUC message 1002 may indicate an initial transmission of a UE as "non-preferred" resources. As noted above, the IUC message 1002 may also be used to transmit information on a MAC cloning attack, where a MAC control element (MAC-CE) 1008 within the IUC message 1002 may include an Rx UE L1 source ID 1010, a Tx UE L1 destination ID 1012, and a cloned L2 source ID 1014.

The diagram 1000 also depicts an application layer message 1016. In one aspect, the Rx UE may transmit the application layer message 1016 to/for the Tx UE to notify the Tx UE of a MAC cloning attack performed on the Tx UE based on the RX UE detecting the MAC cloning attack performed on the Tx UE (i.e., to convey cloning attack information to the Tx UE). The application layer message 1016 may include the Rx UE L1 source ID 1010, the Tx UE L1 destination ID 1012, and the cloned L2 source ID 1014. In an example, the application layer message 1016 may be or include a sensor data sharing message (SDSM) or a collective perception message (CPM). A SDSM may refer to a message format that enables the sharing of sensor data between V2X-enabled vehicles and infrastructure. A CPM may enable a V2X-enabled device (e.g., a V2X-enabled vehicle, a road side unit (RSU), etc.) to share observations with other V2X-enabled devices about object(s) on or near a road that do not include V2X capabilities (e.g., non-V2X vehicles, pedestrians, obstacles, animals, etc.). Collective perception may be defined as the sharing of a perceived environment of a station (e.g., a UE) based on perception sensors. The CPM may be defined as a collective perception basic service PDU. The CPM may enable a collective perception service (CPS).

In one aspect, the IUC message 1002 and/or the application layer message 1016 may be transmitted by an Rx UE to/for a Tx UE to inform the Tx UE that a potential MAC cloning attack has occurred with respect to the Tx UE. For instance, the IUC message 1002 and/or the application layer message 1016 may be transmitted in a unicast session, a multicast (i.e., groupcast) session, or a broadcast session involving the Tx UE and the Rx UE. For instance, in a multicast or a broadcast scenario, an L2 source ID of a victim UE (e.g., a Tx UE) may be cloned and used for a PSID to which the victim UE is not subscribed. If this occurs, the victim UE may not be able to detect that the cloning has occurred. The victim UE may receive the IUC message 1002 and/or the application layer message 1016 in order to be notified of the cloning.

In one aspect, a majority voting algorithm may be utilized by a Tx UE in order to reduce a risk of an Rx UE reporting a fake cloning attack via the IUC message 1002 and/or the application layer message 1016. For instance, the Tx UE may receive IUC messages and/or application layer messages from a plurality of UEs. The Tx UE may determine that a MAC cloning attack has occurred with respect to the Tx UE if a majority of the received IUC messages and/or application layer messages indicate that the MAC cloning attack has occurred.

Figure 11:
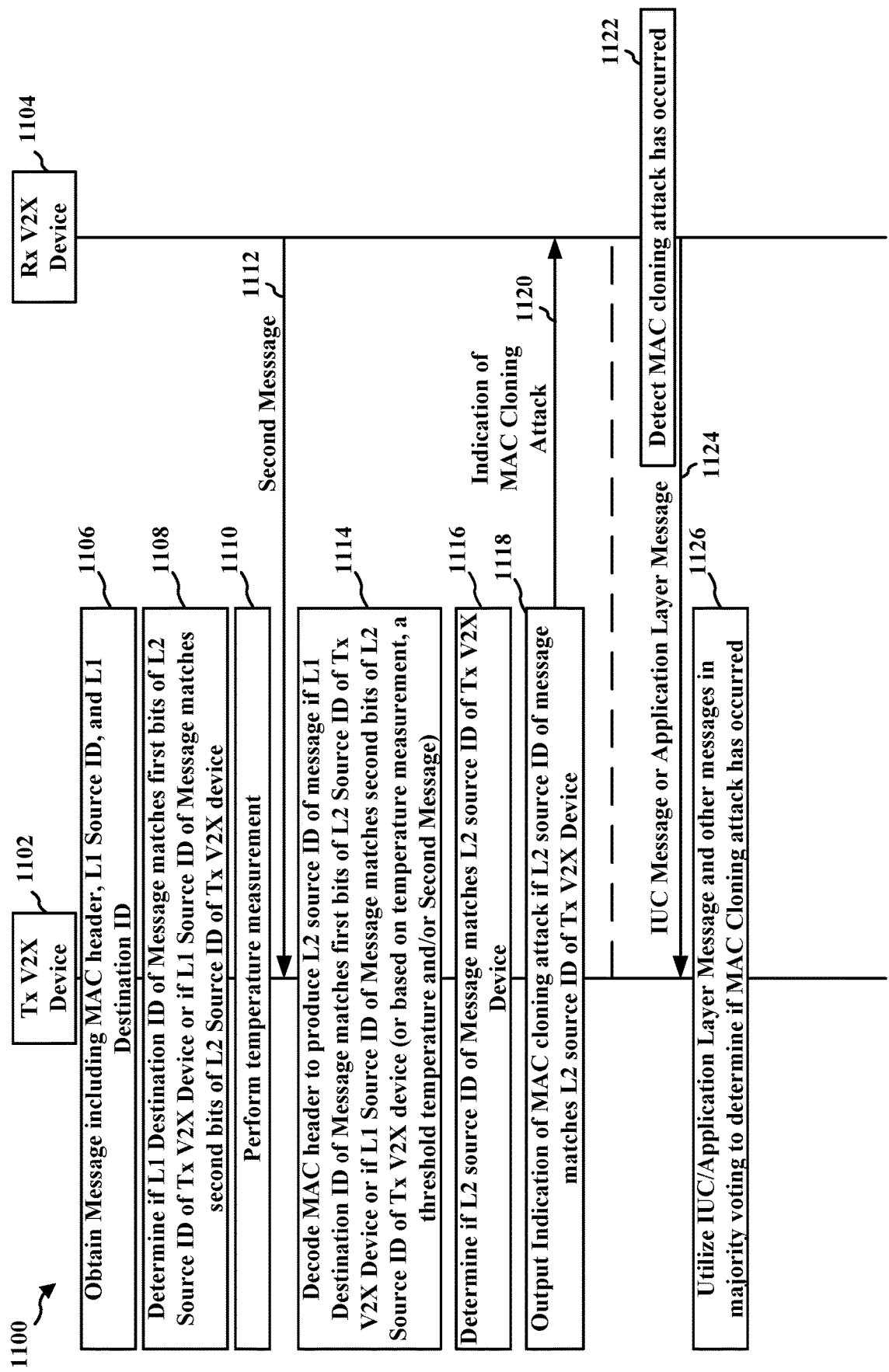
FIG. 11 is a communication flow diagram between a Tx V2X device and an Rx V2X device in accordance with various aspects of the present disclosure.

FIG. 11 is a communication flow diagram 1100 between a Tx V2X device 1102 and an Rx V2X device 1104 in accordance with various aspects of the present disclosure. In an example, the Tx V2X device 1102 may be or include the Tx UE 502. In an example, the Rx V2X device 1104 may be or include the first Rx UE 504, the second Rx UE 506, or the Nth Rx UE 508.

At 1106, the Tx V2X device 1102 may obtain a message including a MAC header, an L1 source ID, and an L1 destination ID. At 1108, the Tx V2X device 1102 may determine if the L1 destination ID of the message matches first bits (e.g., 16) of an L2 source ID of the Tx V2X device 1102 or if the L1 source ID of the message matches second bits (e.g., 8) of the L2 source ID of the Tx V2X device 1102. In one aspect, at 1110, the Tx V2X device 1102 may perform a temperature measurement. In one aspect, at 1112, the Tx V2X device 1102 may receive a message from the Rx V2X device 1104 (or another V2X device).

At 1114, the Tx V2X device 1102 may decode the MAC header of the message to produce an L2 source ID of the message if the L1 destination ID of the message matches the first bits of the L2 source ID of the Tx V2X device or if the L1 source ID of the message matches second bits of the L2 source ID of the Tx V2X device. In some aspects, the Tx V2X device 1102 may decode the MAC header of the message additionally based on the temperature measurement (e.g., if the temperature measurement is less than a threshold temperature). In some aspects, the Tx V2X device 1102 may decode the MAC header of the message additionally based on receiving the second message.

At 1116, the Tx V2X device 1102 may determine whether the L2 source ID of the message (produced via the MAC header decoding) matches an L2 source ID of the Tx V2X device 1102. At 1118, if the L2 source ID of the message matches the L2 source ID of the Tx V2X device 1102, the Tx V2X device 1102 may output an indication that a MAC cloning attack has occurred with respect to the Tx V2X device 1102. For instance, at 1120, the Tx V2X device 1102 may transmit an indication of the MAC cloning attack to/for the Rx V2X device 1104.

In one aspect, at 1122, the Rx V2X device 1104 may detect that a MAC cloning attack has occurred with respect to the Tx V2X device 1102. At 1124, the Rx V2X device 1104 may transmit an IUC message or an application layer message to/for the Tx V2X device 1102. The IUC message or the application layer message may indicate that a MAC cloning attack has occurred with respect to the Tx V2X device 1102. The IUC message or the application layer message may include an L1 source ID of the Rx V2X device 1104, an L1 destination ID of the Tx V2X device 1102, and a cloned L2 ID of the Tx V2X device 1102.

In one aspect, at 1126, the Tx V2X device 1102 may utilize the IUC message or the application layer message along with other messages in a majority voting algorithm in order to determine whether the MAC cloning attack has occurred with respect to the Tx V2X device 1102.

Figure 12:
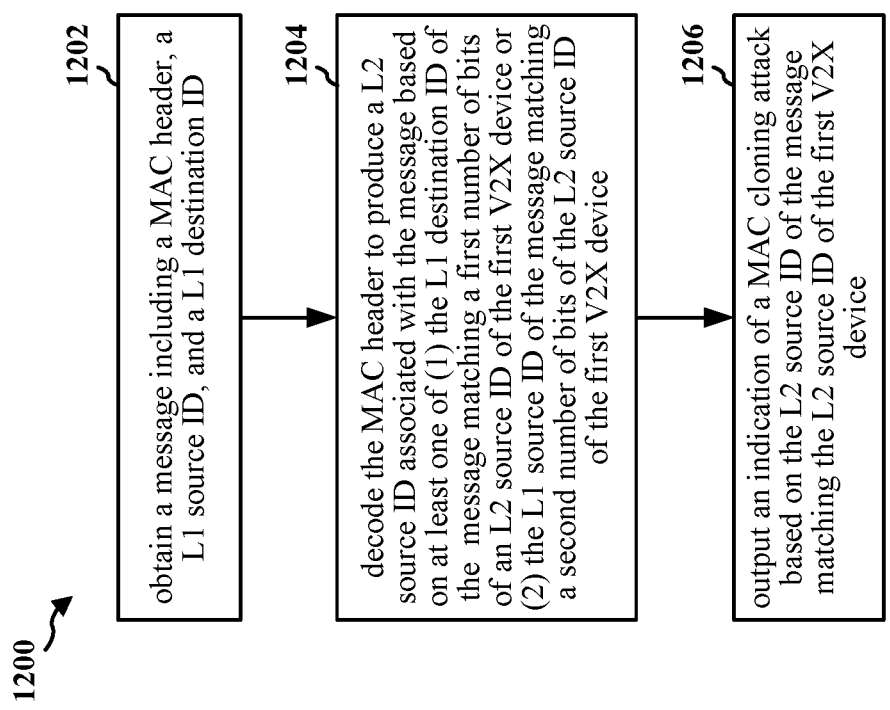
FIG. 12 is a flowchart of a method of wireless communication in accordance with various aspects of the present disclosure.

FIG. 12 is a flowchart 1200 of a method of wireless communication. The method may be performed by a first V2X device (e.g., the UE 104, the base station 102, the UE 402, the UE 404, the UE 406, the UE 408, the OBU 424, the Tx UE 602, the Tx V2X device 1102, the apparatus 1604, the network entity 1702, an RSU, an ego vehicle). In an example, the method may be performed by the MAC cloning attack detector 198 or the MAC cloning attack detector 199.

At 1202, the first V2X device obtains a message including a MAC header, an L1 source ID, and an L1 destination ID. For example, FIG. 11 at 1106 shows that the Tx V2X device 1102 may obtain a message including a MAC header, an L1 source ID, and an L1 destination ID. In an example, the message may be the message 802, the L1 source ID may be the message L1 source ID 806, and the L1 destination ID may be the message L1 destination ID 808. In an example, 1202 may be performed by the MAC cloning attack detector 198 or the MAC cloning attack detector 199.

At 1204, the first V2X device decodes the MAC header to produce an L2 source ID associated with the message based on at least one of (1) the L1 destination ID of the message matching a first number of bits of an L2 source ID of the first V2X device or (2) the L1 source ID of the message matching a second number of bits of the L2 source ID of the first V2X device. For example, FIG. 11 at 1114 shows that the Tx V2X device 1102 may decode the MAC header to produce an L2 source ID associated with the message based on at least one of (1) the L1 destination ID of the message matching a first number of bits of an L2 source ID of the first V2X device or (2) the L1 source ID of the message matching a second number of bits of the L2 source ID of the first V2X device. In another example, the aforementioned aspect may correspond to 716, 718, and 722 of the second example 714 of FIG. 7. In another example, the L2 source ID associated with the message may be the message L2 source ID 902 and the L2 source ID of the first V2X device may be the Tx UE L2 source ID 814. In an example, 1204 may be performed by the MAC cloning attack detector 198 or the MAC cloning attack detector 199.

At 1206, the first V2X device outputs an indication of a MAC cloning attack based on the L2 source ID of the message matching the L2 source ID of the first V2X device. For example, FIG. 11 at 1118 shows that the Tx V2X device 1102 may output an indication of a MAC cloning attack based on the L2 source ID of the message matching the L2 source ID of the Tx V2X device 1102. In an example, the L2 source ID of the first V2X device may be the Tx UE L2 source ID. In an example, the aforementioned aspect may correspond to 724 of the second example 714 of FIG. 7. In an example, 1206 may be performed by the MAC cloning attack detector 198 or the MAC cloning attack detector 199.

Figure 13:
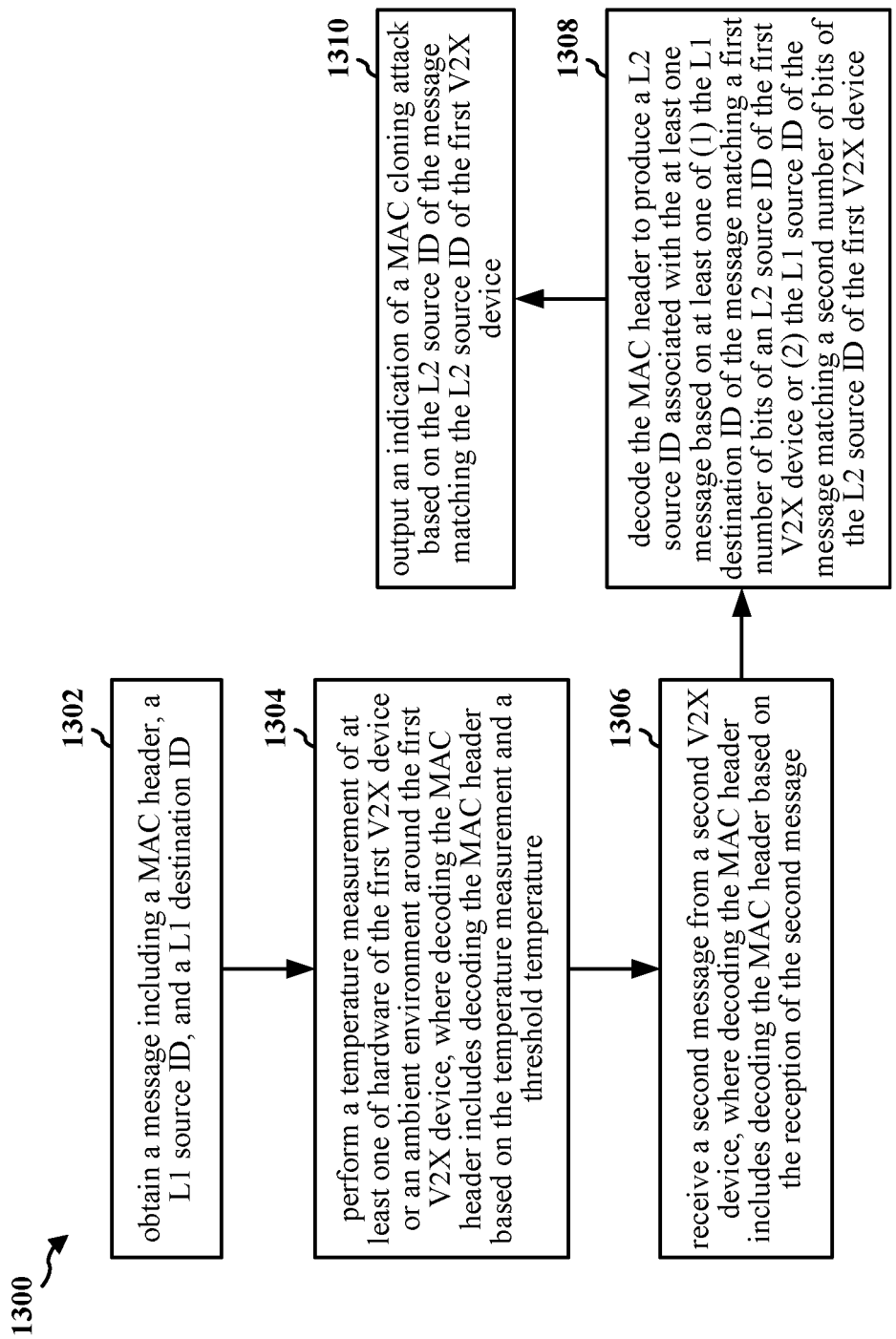
FIG. 13 is a flowchart of a method of wireless communication in accordance with various aspects of the present disclosure.

FIG. 13 is a flowchart 1300 of a method of wireless communication. The method may be performed by a first V2X device (e.g., the UE 104, the base station 102, the UE 402, the UE 404, the UE 406, the UE 408, the OBU 424, the Tx UE 602, the Tx V2X device 1102, the apparatus 1604, the network entity 1702, an RSU, an ego vehicle). In an example, the method (including the various aspects detailed below) may be performed by the MAC cloning attack detector 198 or the MAC cloning attack detector 199.

At 1302, the first V2X device obtains a message including a MAC header, an L1 source ID, and an L1 destination ID. For example, FIG. 11 at 1106 shows that the Tx V2X device 1102 may obtain a message including a MAC header, an L1 source ID, and an L1 destination ID. In an example, the message may be the message 802, the L1 source ID may be the message L1 source ID 806, and the L1 destination ID may be the message L1 destination ID 808. In an example, 1302 may be performed by the MAC cloning attack detector 198 or the MAC cloning attack detector 199.

At 1308, the first V2X device decodes the MAC header to produce an L2 source ID associated with the message based on at least one of (1) the L1 destination ID of the message matching a first number of bits of an L2 source ID of the first V2X device or (2) the L1 source ID of the message matching a second number of bits of the L2 source ID of the first V2X device. For example, FIG. 11 at 1114 shows that the Tx V2X device 1102 may decode the MAC header to produce an L2 source ID associated with the message based on at least one of (1) the L1 destination ID of the message matching a first number of bits of an L2 source ID of the first V2X device or (2) the L1 source ID of the message matching a second number of bits of the L2 source ID of the first V2X device. In another example, the aforementioned aspect may correspond to 716, 718, and 722 of the second example 714 of FIG. 7. In another example, the L2 source ID associated with the message may be the message L2 source ID 902 and the L2 source ID of the first V2X device may be the Tx UE L2 source ID 814. In an example, 1308 may be performed by the MAC cloning attack detector 198 or the MAC cloning attack detector 199.

At 1310, the first V2X device outputs an indication of a MAC cloning attack based on the L2 source ID of the message matching the L2 source ID of the first V2X device. For example, FIG. 11 at 1118 shows that the Tx V2X device 1102 may output an indication of a MAC cloning attack based on the L2 source ID of the message matching the L2 source ID of the Tx V2X device 1102. In an example, the L2 source ID of the first V2X device may be the Tx UE L2 source ID. In an example, the aforementioned aspect may correspond to 724 of the second example 714 of FIG. 7. In an example, 1310 may be performed by the MAC cloning attack detector 198 or the MAC cloning attack detector 199.

In one aspect, the first V2X device may be at least one of a vehicle, an ego vehicle, a UE, a RSU, an OBU, or a network node. For example, the Tx V2X device 1102 may be a vehicle, an ego vehicle, a UE, a RSU, an OBU, and/or a network node.

In one aspect, outputting the indication of the MAC cloning attack may occur during a unicast session between the first V2X device and a second V2X device. For example, the unicast session may include aspects described above in connection with the first example 510 of FIG. 5. In an example, the second V2X device may be the first Rx UE 504. In another example, the second V2X device may be the Rx V2X device 1104.

In one aspect, at 1304, the first V2X device may perform a temperature measurement of at least one of hardware of the first V2X device or an ambient environment around the first V2X device, where decoding the MAC header may include decoding the MAC header based on the temperature measurement and a threshold temperature. For example, FIG. 11 at 1110 shows that the Tx V2X device 1102 may perform a temperature measurement of hardware of the Tx V2X device 1102 and/or of an ambient environment around the Tx V2X device 1102. Furthermore, FIG. 11 at 1114 shows that decoding the MAC header may be based on the temperature measurement and a threshold temperature. In an example, 1304 may be performed by the MAC cloning attack detector 198 or the MAC cloning attack detector 199.

In one aspect, decoding the MAC header may include decoding the MAC header if the temperature measurement is less than or equal to the threshold temperature. For example, decoding the MAC header at 1114 may be based on the temperature measurement being less than or equal to the threshold temperature.

In one aspect, at 1306, the first V2X device may receive a second message from a second V2X device, where decoding the MAC header may include decoding the MAC header based on the reception of the second message. For example, FIG. 11 at 1112 shows that the Tx V2X device 1102 may receive a second message from the Rx V2X device 1104. Furthermore, FIG. 11 at 1114 shows that decoding the MAC header may be based on receiving the second message. In an example, 1306 may be performed by the MAC cloning attack detector 198 or the MAC cloning attack detector 199.

In one aspect, the L1 destination ID of the message may include sixteen bits, and where the first number of bits may include sixteen LSBs of the L2 source ID of the first V2X device. For example, FIG. 8 shows that the message L1 destination ID 808 may include sixteen bits and that the Tx UE L2 source ID 814 may include 16 LSBs.

In one aspect, the L1 source ID of the message may include eight bits, and where the second number of bits may include eight LSBs of the L2 source ID of the first V2X device. For example, FIG. 8 shows that the message L1 source ID 806 may include eight bits and that the Tx UE L2 source ID 814 may include 8 LSBs.

In one aspect, decoding the MAC header may include decoding the MAC header further based on the L1 destination ID of the message matching a third number of bits of a PSID associated with the first V2X device. For example, the aforementioned aspect may correspond to 716 of the second example 714 of FIG. 7.

In one aspect, outputting the indication of the MAC cloning attack may include transmitting a second message to a second V2X device. For example, FIG. 11 at 1120 shows that the Tx V2X device 1102 may transmit an indication of a MAC cloning attack to the Rx V2X device 1104 in a message.

Figure 14:
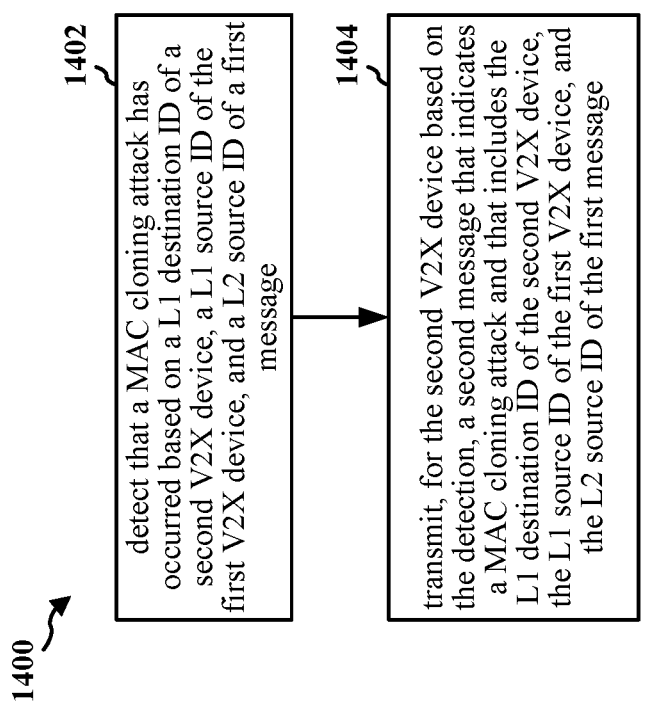
FIG. 14 is a flowchart of a method of wireless communication in accordance with various aspects of the present disclosure.

FIG. 14 is a flowchart 1400 of a method of wireless communication. The method may be performed by a first V2X device (e.g., the UE 104, the base station 102, the UE 402, the UE 404, the UE 406, the UE 408, the OBU 424, the Rx UE 604, the Rx V2X device 1104, the apparatus 1604, the network entity 1702, an RSU, an ego vehicle). In an example, the method may be performed by the MAC cloning attack detector 198 or the MAC cloning attack detector 199.

At 1402, the first V2X device detects that a MAC cloning attack has occurred based on an L1 destination ID of a second V2X device, an L1 source ID of the first V2X device, and an L2 source ID of a first message. For example, FIG. 11 at 1122 shows that the Rx V2X device 1102 may detect that a MAC cloning attack has occurred based on an L1 destination ID of a second V2X device, an L1 source ID of the first V2X device, and an L2 source ID of a first message. In an example, the second V2X device may be the Tx V2X device 1102. In an example, 1402 may be performed by the MAC cloning attack detector 198 or the MAC cloning attack detector 199.

At 1404, the first V2X device transmits, for the second V2X device based on the detection, a second message that indicates a MAC cloning attack and that includes the L1 destination ID of the second V2X device, the L1 source ID of the first V2X device, and the L2 source ID of the first message. For example, FIG. 11 at 1124 shows that the Rx V2X device 1104 may transmit an IUC message or an application layer message (i.e., a second message) that indicates a MAC cloning attack and that includes the L1 destination ID of the second V2X device, the L1 source ID of the first V2X device, and the L2 source ID of the first message. In an example, the second message may be or include the IUC message 1002 or the application layer message 1016. In an example, 1404 may be performed by the MAC cloning attack detector 198 or the MAC cloning attack detector 199.

Figure 15:
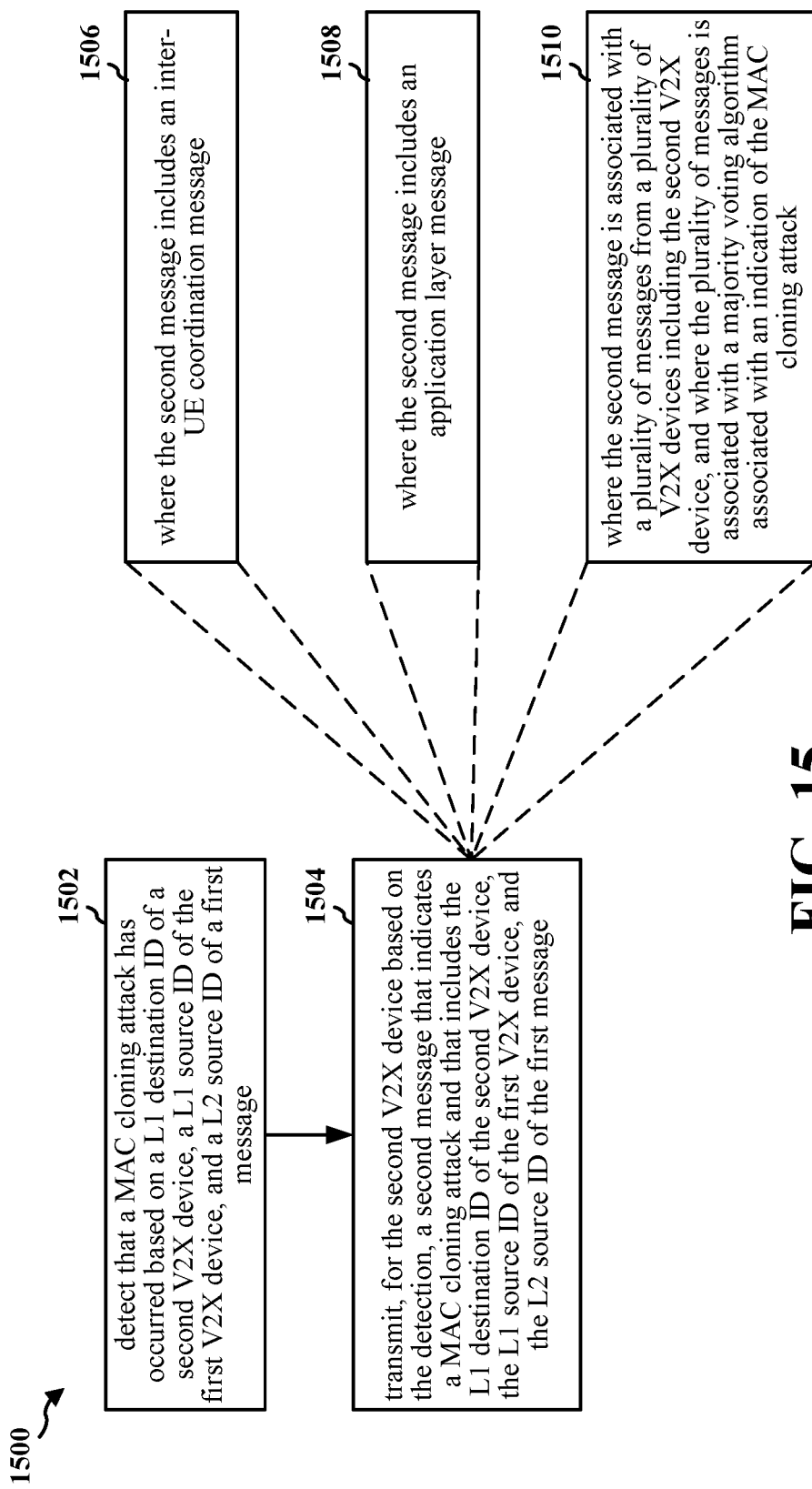
FIG. 15 is a flowchart of a method of wireless communication in accordance with various aspects of the present disclosure.

FIG. 15 is a flowchart 1500 of a method of wireless communication. The method may be performed by a first V2X device (e.g., the UE 104, the base station 102, the UE 402, the UE 404, the UE 406, the UE 408, the OBU 424, the Rx UE 604, the Rx V2X device 1104, the apparatus 1604, the network entity 1702, an RSU, an ego vehicle). In an example, the method (including the various aspects detailed below) may be performed by the MAC cloning attack detector 198 or the MAC cloning attack detector 199.

At 1502, the first V2X device detects that a MAC cloning attack has occurred based on an L1 destination ID of a second V2X device, an L1 source ID of the first V2X device, and an L2 source ID of a first message. For example, FIG. 11 at 1122 shows that the Rx V2X device 1102 may detect that a MAC cloning attack has occurred based on an L1 destination ID of a second V2X device, an L1 source ID of the first V2X device, and an L2 source ID of a first message. In an example, the second V2X device may be the Tx V2X device 1102. In an example, 1502 may be performed by the MAC cloning attack detector 198 or the MAC cloning attack detector 199.

At 1504, the first V2X device transmits, for the second V2X device based on the detection, a second message that indicates a MAC cloning attack and that includes the L1 destination ID of the second V2X device, the L1 source ID of the first V2X device, and the L2 source ID of the first message. For example, FIG. 11 at 1124 shows that the Rx V2X device 1104 may transmit an IUC message or an application layer message (i.e., a second message) that indicates a MAC cloning attack and that includes the L1 destination ID of the second V2X device, the L1 source ID of the first V2X device, and the L2 source ID of the first message. In an example, the second message may be or include the IUC message 1002 or the application layer message 1016. In an example, 1504 may be performed by the MAC cloning attack detector 198 or the MAC cloning attack detector 199.

In one aspect, at 1506, the second message may include an inter-UE coordination message. For example, the second message may be or include the IUC message 1002.

In one aspect, the L1 destination ID of the second V2X device, the L1 source ID of the first V2X device, and the L2 source ID of the first message may be included in a MAC-CE of the inter-UE coordination message. For example, the MAC-CE may be the MAC-CE 1008, the L1 destination ID of the second V2X device may be the Tx UE L1 destination ID 1012, the L1 source ID of the first V2X device may be the Rx UE L1 source ID 1010, and the L2 source ID of the first message may be the cloned L2 source ID 1014.

In one aspect, at 1508, the second message may include an application layer message. For example, the second message may be or include the application layer message 1016.

In one aspect, the application layer message may include a CPM or an SDSM. For example, the application layer message 1016 may be or include a CPM and/or a SDSM.

In one aspect, transmitting the second message may include transmitting the second message during at least one of a unicast session between the first V2X device and the second V2X device, a groupcast session between the first V2X device and the second V2X device, or a broadcast session associated with the first V2X device. For example, the IUC message or the application layer message may be transmitted at 1124 during a unicast session between the Rx V2X device 1104 and the Tx V2X device 1102, a groupcast session between the Rx V2X device 1104 and at least the Tx V2X device 1102, or a broadcast session associated with the Rx V2X device 1104. In another example, the unicast session, the groupcast session, and the broadcast session may include aspects described above in connection with the first example 510, the second example 512, and the third example 514 of FIG. 5, respectively.

In one aspect, at 1510, the second message may be associated with a plurality of messages from a plurality of V2X devices including the second V2X device, and where the plurality of messages may be associated with a majority voting algorithm associated with an indication of the MAC cloning attack. For example, FIG. 11 at 1126 shows that the second message may be associated with a plurality of messages from a plurality of V2X devices including the second V2X device, and where the plurality of messages may be associated with a majority voting algorithm associated with an indication of the MAC cloning attack.

In one aspect, the first V2X device may be at least one of a first vehicle, a first ego vehicle, a first UE, a first RSU, a first OBU, or a first network node, and where the second V2X device may be at least one of a second vehicle, a second ego vehicle, a second UE, a second RSU, a second OBU, or a second network node. For example, the Rx V2X device 1104 may be a first vehicle, a first ego vehicle, a first UE, a first RSU, a first OBU, and/or a first network node and the Tx V2X device 1102 may be a second vehicle, a second ego vehicle, a second UE, a second RSU, a second OBU, and/or a second network node.

Figure 16:
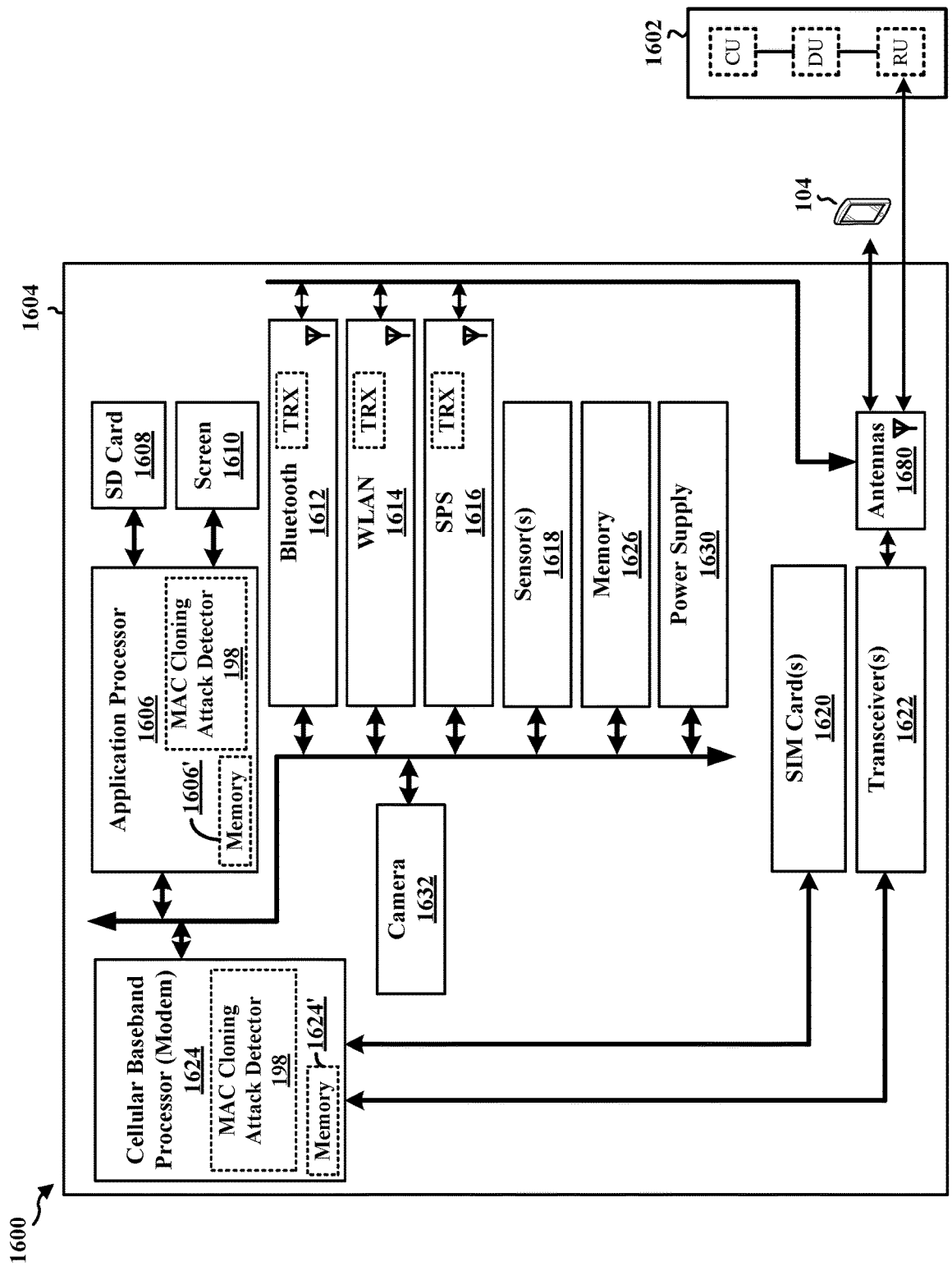
FIG. 16 is a diagram illustrating an example of a hardware implementation for an example apparatus and/or network entity.

FIG. 16 is a diagram 1600 illustrating an example of a hardware implementation for an apparatus 1604. The apparatus 1604 may be a UE, a component of a UE, or may implement UE functionality. In some aspects, the apparatus 1604 may include a cellular baseband processor 1624 (also referred to as a modem) coupled to one or more transceivers 1622 (e.g., cellular RF transceiver). The cellular baseband processor 1624 may include on-chip memory 1624'. In some aspects, the apparatus 1604 may further include one or more subscriber identity modules (SIM) cards 1620 and an application processor 1606 coupled to a secure digital (SD) card 1608 and a screen 1610. The application processor 1606 may include on-chip memory 1606'. In some aspects, the apparatus 1604 may further include a Bluetooth module 1612, a WLAN module 1614, an SPS module 1616 (e.g., GNSS module), one or more sensor modules 1618 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1626, a power supply 1630, and/or a camera 1632. The Bluetooth module 1612, the WLAN module 1614, and the SPS module 1616 may include an on-chip transceiver (TRX) (or in some cases, just a receiver (RX)). The Bluetooth module 1612, the WLAN module 1614, and the SPS module 1616 may include their own dedicated antennas and/or utilize the antennas 1680 for communication. The cellular baseband processor 1624 communicates through the transceiver(s) 1622 via one or more antennas 1680 with the UE 104 and/or with an RU associated with a network entity 1602. The cellular baseband processor 1624 and the application processor 1606 may each include a computer-readable medium/memory 1624', 1606', respectively. The additional memory modules 1626 may also be considered a computer-readable medium/memory. Each computer-readable medium/memory 1624', 1606', 1626 may be non-transitory. The cellular baseband processor 1624 and the application processor 1606 are each responsible for general processing, including the execution of software stored on the computer-readable medium/memory. The software, when executed by the cellular baseband processor 1624/application processor 1606, causes the cellular baseband processor 1624/application processor 1606 to perform the various functions described supra. The computer-readable medium/memory may also be used for storing data that is manipulated by the cellular baseband processor 1624/application processor 1606 when executing software. The cellular baseband processor 1624/application processor 1606 may be a component of the UE 350 and may include the memory 360 and/or at least one of the TX processor 368, the RX processor 356, and the controller/processor 359. In one configuration, the apparatus 1604 may be a processor chip (modem and/or application) and include just the cellular baseband processor 1624 and/or the application processor 1606, and in another configuration, the apparatus 1604 may be the entire UE (e.g., see UE 350 of FIG. 3) and include the additional modules of the apparatus 1604.

As discussed supra, the MAC cloning attack detector 198 may be configured to obtain a message including a medium access control (MAC) header, a layer 1 (L1) source identifier (ID), and an L1 destination ID. The MAC cloning attack detector 198 may be configured to decode the MAC header to produce a layer 2 (L2) source ID associated with the message based on at least one of (1) the L1 destination ID of the message matching a first number of bits of an L2 source ID of the first V2X device or (2) the L1 source ID of the message matching a second number of bits of the L2 source ID of the first V2X device. The MAC cloning attack detector 198 may be configured to output an indication of a MAC cloning attack based on the L2 source ID of the message matching the L2 source ID of the first V2X device. The MAC cloning attack detector 198 may be configured to perform a temperature measurement of at least one of hardware of the first V2X device or an ambient environment around the first V2X device, where decoding the MAC header is based on the temperature measurement and a threshold temperature. The MAC cloning attack detector 198 may be configured to a second message from a second V2X device, where decoding the MAC header is based on the reception of the second message. The MAC cloning attack detector 198 may be configured to detect that a medium access control (MAC) cloning attack has occurred based on a layer 1 (L1) destination identifier (ID) of a second V2X device, an L1 source ID of the first V2X device, and a layer 2 (L2) source ID of a first message. The MAC cloning attack detector 198 may be configured to transmit, for the second V2X device based on the detection, a second message that indicates a MAC cloning attack and that includes the L1 destination ID of the second V2X device, the L1 source ID of the first V2X device, and the L2 source ID of the first message. The MAC cloning attack detector 198 may be within the cellular baseband processor 1624, the application processor 1606, or both the cellular baseband processor 1624 and the application processor 1606. The MAC cloning attack detector 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1604 may include a variety of components configured for various functions. In one configuration, the apparatus 1604, and in particular the cellular baseband processor 1624 and/or the application processor 1606, may include means for obtaining a message including a medium access control (MAC) header, a layer 1 (L1) source identifier (ID), and an L1 destination ID. In one configuration, the apparatus 1604, and in particular the cellular baseband processor 1624 and/or the application processor 1606, may include means for decoding the MAC header to produce a layer 2 (L2) source ID associated with the message based on at least one of (1) the L1 destination ID of the message matching a first number of bits of an L2 source ID of the first V2X device or (2) the L1 source ID of the message matching a second number of bits of the L2 source ID of the first V2X device. In one configuration, the apparatus 1604, and in particular the cellular baseband processor 1624 and/or the application processor 1606, may include means for outputting an indication of a MAC cloning attack based on the L2 source ID of the message matching the L2 source ID of the first V2X device. In one configuration, the apparatus 1604, and in particular the cellular baseband processor 1624 and/or the application processor 1606, may include means for performing a temperature measurement of at least one of hardware of the first V2X device or an ambient environment around the first V2X device, where decoding the MAC header includes decoding the MAC header based on the temperature measurement and a threshold temperature. In one configuration, the apparatus 1604, and in particular the cellular baseband processor 1624 and/or the application processor 1606, may include means for receiving a second message from a second V2X device, where decoding the MAC header includes decoding the MAC header based on the reception of the second message. In one configuration, the apparatus 1604, and in particular the cellular baseband processor 1624 and/or the application processor 1606, may include means for detecting that a medium access control (MAC) cloning attack has occurred based on a layer 1 (L1) destination identifier (ID) of a second V2X device, an L1 source ID of the first V2X device, and a layer 2 (L2) source ID of a first message. In one configuration, the apparatus 1604, and in particular the cellular baseband processor 1624 and/or the application processor 1606, may include means for transmitting, for the second V2X device based on the detection, a second message that indicates a MAC cloning attack and that includes the L1 destination ID of the second V2X device, the L1 source ID of the first V2X device, and the L2 source ID of the first message. The means may be the MAC cloning attack detector 198 of the apparatus 1604 configured to perform the functions recited by the means. As described supra, the apparatus 1604 may include the TX processor 368, the RX processor 356, and the controller/processor 359. As such, in one configuration, the means may be the TX processor 368, the RX processor 356, and/or the controller/processor 359 configured to perform the functions recited by the means.

Figure 17:
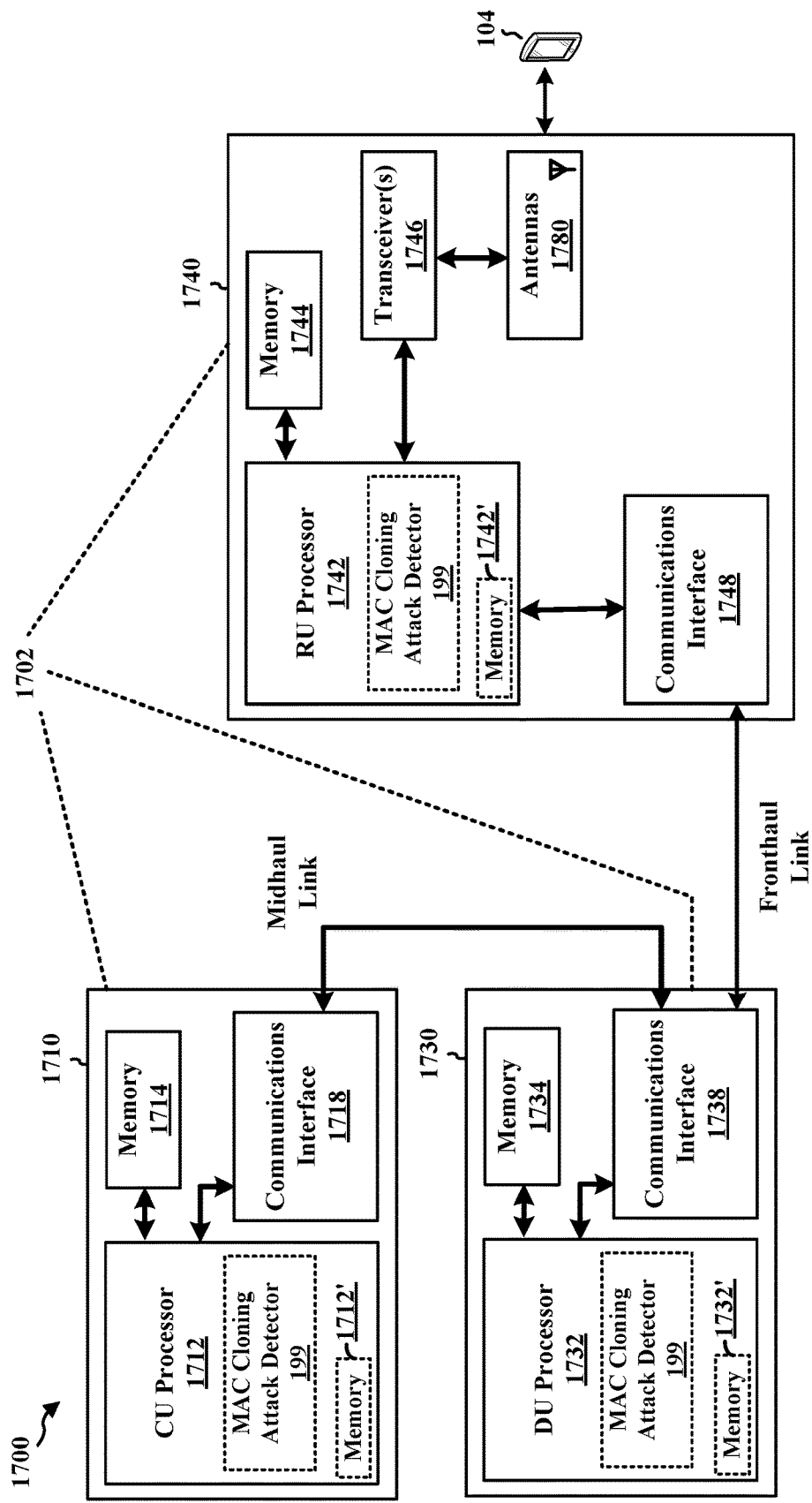
FIG. 17 is a diagram illustrating an example of a hardware implementation for an example network entity.

FIG. 17 is a diagram 1700 illustrating an example of a hardware implementation for a network entity 1702. The network entity 1702 may be a BS, a component of a BS, or may implement BS functionality. The network entity 1702 may include at least one of a CU 1710, a DU 1730, or an RU 1740. For example, depending on the layer functionality handled by the MAC cloning attack detector 199, the network entity 1702 may include the CU 1710; both the CU 1710 and the DU 1730; each of the CU 1710, the DU 1730, and the RU 1740; the DU 1730; both the DU 1730 and the RU 1740; or the RU 1740. The CU 1710 may include a CU processor 1712. The CU processor 1712 may include on-chip memory 1712'. In some aspects, the CU 1710 may further include additional memory modules 1714 and a communications interface 1718. The CU 1710 communicates with the DU 1730 through a midhaul link, such as an F1 interface. The DU 1730 may include a DU processor 1732. The DU processor 1732 may include on-chip memory 1732'. In some aspects, the DU 1730 may further include additional memory modules 1734 and a communications interface 1738. The DU 1730 communicates with the RU 1740 through a fronthaul link. The RU 1740 may include an RU processor 1742. The RU processor 1742 may include on-chip memory 1742'. In some aspects, the RU 1740 may further include additional memory modules 1744, one or more transceivers 1746, antennas 1780, and a communications interface 1748. The RU 1740 communicates with the UE 104. The on-chip memory 1712', 1732', 1742' and the additional memory modules 1714, 1734, 1744 may each be considered a computer-readable medium/memory. Each computer-readable medium/memory may be non-transitory. Each of the processors 1712, 1732, 1742 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the MAC cloning attack detector 199 may be configured to obtain a message including a medium access control (MAC) header, a layer 1 (L1) source identifier (ID), and an L1 destination ID. The MAC cloning attack detector 199 may be configured to decode the MAC header to produce a layer 2 (L2) source ID associated with the message based on at least one of (1) the L1 destination ID of the message matching a first number of bits of an L2 source ID of the first V2X device or (2) the L1 source ID of the message matching a second number of bits of the L2 source ID of the first V2X device. The MAC cloning attack detector 199 may be configured to output an indication of a MAC cloning attack based on the L2 source ID of the message matching the L2 source ID of the first V2X device. The MAC cloning attack detector 199 may be configured to perform a temperature measurement of at least one of hardware of the first V2X device or an ambient environment around the first V2X device, where to decoding the MAC header is based on the temperature measurement and a threshold temperature. The MAC cloning attack detector 199 may be configured to receive a second message from a second V2X device, where decoding the MAC header is based on the reception of the second message. The MAC cloning attack detector 199 may be configured to detect that a medium access control (MAC) cloning attack has occurred based on a layer 1 (L1) destination identifier (ID) of a second V2X device, an L1 source ID of the first V2X device, and a layer 2 (L2) source ID of a first message. The MAC cloning attack detector 199 may be configured to transmit, for the second V2X device based on the detection, a second message that indicates a MAC cloning attack and that includes the L1 destination ID of the second V2X device, the L1 source ID of the first V2X device, and the L2 source ID of the first message. The MAC cloning attack detector 199 may be within one or more processors of one or more of the CU 1710, DU 1730, and the RU 1740. The MAC cloning attack detector 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1702 may include a variety of components configured for various functions. In one configuration, the network entity 1702 may include means for obtaining a message including a medium access control (MAC) header, a layer 1 (L1) source identifier (ID), and an L1 destination ID. In one configuration, the network entity 1702 may include means for decoding the MAC header to produce a layer 2 (L2) source ID associated with the message based on at least one of (1) the L1 destination ID of the message matching a first number of bits of an L2 source ID of the first V2X device or (2) the L1 source ID of the message matching a second number of bits of the L2 source ID of the first V2X device. In one configuration, the network entity 1702 may include means for outputting an indication of a MAC cloning attack based on the L2 source ID of the message matching the L2 source ID of the first V2X device. In one configuration, the network entity 1702 may include means for performing a temperature measurement of at least one of hardware of the first V2X device or an ambient environment around the first V2X device, where decoding the MAC header includes decoding the MAC header based on the temperature measurement and a threshold temperature. In one configuration, the network entity 1702 may include means for receiving a second message from a second V2X device, where decoding the MAC header includes decoding the MAC header based on the reception of the second message. In one configuration, the network entity 1702 may include means for detecting that a medium access control (MAC) cloning attack has occurred based on a layer 1 (L1) destination identifier (ID) of a second V2X device, an L1 source ID of the first V2X device, and a layer 2 (L2) source ID of a first message. In one configuration, the network entity 1702 may include means for transmitting, for the second V2X device based on the detection, a second message that indicates a MAC cloning attack and that includes the L1 destination ID of the second V2X device, the L1 source ID of the first V2X device, and the L2 source ID of the first message. The means may be the MAC cloning attack detector 199 of the network entity 1702 configured to perform the functions recited by the means. As described supra, the network entity 1702 may include the TX processor 316, the RX processor 370, and the controller/processor 375. As such, in one configuration, the means may be the TX processor 316, the RX processor 370, and/or the controller/processor 375 configured to perform the functions recited by the means.

A sidelink MAC cloning attack may occur when an attacking device clones (i.e., copies) a source L2 address of a victim device (e.g., a victim OBU, a victim road side unit (RSU), etc.) and uses the cloned source L2 address of the victim device to transmit messages that appear to be from the victim device, but are in fact from the attacking device. An Rx UE may utilize misbehavior detection schemes to identify a sidelink MAC cloning attack (or another type of MAC cloning attack). The Rx UE may order lower protocol layers (e.g., L1) to filter incoming packets from the (cloned) source L2 address. However, such misbehavior detection schemes may cause an Rx UE to filter (legitimate) packets from the victim device (e.g., the victim OBU, the victim RSU, etc.) as well. Furthermore, for a unicast transmission, if an L1 destination ID of a transmission does not match an L1 destination ID of a TX UE, the Tx UE may not decode transmissions from an attacking device, except for retrieving an L1 source ID (i.e., an L1 source address) and an L1 destination ID from a SCI-2 transmission. As a result, the Tx UE may not be able to detect that the attacking device has cloned the L2 source ID of the Tx UE, that is, the Tx UE may not be able to detect that a MAC cloning attack has occurred.

Various technologies pertaining to MAC address cloning attack detection for V2X are described herein. In an example, a first V2X device (e.g., a Tx V2X device) obtains a message including a MAC header, an L1 source ID, and an L1 destination ID. The first V2X device decodes the MAC header to produce an L2 source ID associated with the message based on at least one of (1) the L1 destination ID of the message matching a first number of bits of an L2 source ID of the first V2X device or (2) the L1 source ID of the message matching a second number of bits of the L2 source ID of the first V2X device. The first V2X device outputs an indication of a MAC cloning attack based on the L2 source ID of the message matching the L2 source ID of the first V2X device. Vis-à-vis decoding the MAC header to produce an L2 source ID associated with the message based on at least one of (1) the L1 destination ID of the message matching a first number of bits of an L2 source ID of the first V2X device or (2) the L1 source ID of the message matching a second number of bits of the L2 source ID of the first V2X device, an ability of the V2X device to detect a MAC cloning attack may be increased compared to a V2X device that decodes a MAC header if an L1 destination ID of a message matches a first number of bits of an L2 source ID of the first V2X device.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first vehicle-to-everything (V2X) device, comprising: obtaining a message comprising a medium access control (MAC) header, a layer 1 (L1) source identifier (ID), and an L1 destination ID; decoding the MAC header to produce a layer 2 (L2) source ID associated with the message based on at least one of (1) the L1 destination ID of the message matching a first number of bits of an L2 source ID of the first V2X device or (2) the L1 source ID of the message matching a second number of bits of the L2 source ID of the first V2X device; and outputting an indication of a MAC cloning attack based on the L2 source ID of the message matching the L2 source ID of the first V2X device.

Aspect 2 may be combined with aspect 1 and comprises that the first V2X device is at least one of a vehicle, an ego vehicle, a user equipment (UE), a roadside unit (RSU), an on-board unit (OBU), or a network node.

Aspect 3 may be combined with any of aspects 1-2 and comprises that outputting the indication of the MAC cloning attack occurs during a unicast session between the first V2X device and a second V2X device.

Aspect 4 may be combined with any of aspects 1-3 and further comprises performing a temperature measurement of at least one of hardware of the first V2X device or an ambient environment around the first V2X device, wherein decoding the MAC header comprises decoding the MAC header based on the temperature measurement and a threshold temperature.

Aspect 5 may be combined with aspect 4 and comprises that decoding the MAC header comprises decoding the MAC header if the temperature measurement is less than or equal to the threshold temperature.

Aspect 6 may be combined with any of aspects 1-3 and further comprises receiving a second message from a second V2X device, wherein decoding the MAC header comprises decoding the MAC header based on the reception of the second message.

Aspect 7 may be combined with any of aspects 1-6 and comprises that the L1 destination ID of the message comprises sixteen bits, and wherein the first number of bits comprises sixteen least significant bits (LSBs) of the L2 source ID of the first V2X device.

Aspect 8 may be combined with any of aspects 1-7 and comprises that the L1 source ID of the message comprises eight bits, and wherein the second number of bits comprises eight least significant bits (LSBs) of the L2 source ID of the first V2X device.

Aspect 9 may be combined with any of aspects 1-8 and comprises that decoding the MAC header comprises decoding the MAC header further based on the L1 destination ID of the message matching a third number of bits of a provider service ID (PSID) associated with the first V2X device.

Aspect 10 may be combined with any of aspects 1-9 and comprises that outputting the indication of the MAC cloning attack comprises transmitting a second message to a second V2X device.

Aspect 11 is an apparatus for wireless communication at a first vehicle-to-everything (V2X) device comprising a memory and a processor coupled to the memory and based on information stored in the memory, the processor is configured to perform a method in accordance with any of aspects 1-10.

Aspect 12 is an apparatus for wireless communications, comprising means for performing a method in accordance with any of aspects 1-10.

Aspect 13 is the apparatus of aspect 11 or 12 further comprising a wireless communication device comprising at least one of a transceiver or an antenna coupled to the processor, wherein the processor is configured to obtain the message via at least one of the transceiver or the antenna Aspect 14 is a computer-readable medium (e.g., a non-transitory computer-readable medium) comprising instructions that, when executed by a processor, cause the processor to perform a method in accordance with any of aspects 1-10.

Aspect 15 is a method of wireless communication at a first vehicle-to-everything (V2X) device, comprising: detecting that a medium access control (MAC) cloning attack has occurred based on a layer 1 (L1) destination identifier (ID) of a second V2X device, an L1 source ID of the first V2X device, and a layer 2 (L2) source ID of a first message; and transmitting, for the second V2X device based on the detection, a second message that indicates a MAC cloning attack and that comprises the L1 destination ID of the second V2X device, the L1 source ID of the first V2X device, and the L2 source ID of the first message.

Aspect 16 may be combined with aspect 15 and comprises that the second message comprises an inter-user equipment (inter-UE) coordination message.

Aspect 17 may be combined with aspect 16 and comprises that the L1 destination ID of the second V2X device, the L1 source ID of the first V2X device, and the L2 source ID of the first message are included in a MAC control element (MAC-CE) of the inter-UE coordination message.

Aspect 18 may be combined with aspect 15 and comprises that the second message comprises an application layer message.

Aspect 19 may be combined with aspect 18 and comprises that the application layer message comprises a cooperative perception message (CPM) or a sensor data sharing message (SDSM).

Aspect 20 may be combined with any of aspects 15-19 and comprises that transmitting the second message comprises transmitting the second message during at least one of a unicast session between the first V2X device and the second V2X device, a groupcast session between the first V2X device and the second V2X device, or a broadcast session associated with the first V2X device.

Aspect 21 may be combined with any of aspects 15-20 and comprises that the second message is associated with a plurality of messages from a plurality of V2X devices comprising the second V2X device, and wherein the plurality of messages is associated with a majority voting algorithm associated with an indication of the MAC cloning attack.

Aspect 22 may be combined with any of aspects 15-21 and comprises that the first V2X device is at least one of a first vehicle, a first ego vehicle, a first user equipment (UE), a first roadside unit (RSU), a first on-board unit (OBU), or a first network node, and wherein the second V2X device is at least one of a second vehicle, a second ego vehicle, a second UE, a second RSU, a second OBU, or a second network node.

Aspect 23 is an apparatus for wireless communication at a first vehicle-to-everything (V2X) device comprising a memory and a processor coupled to the memory and based on information stored in the memory, the processor is configured to perform a method in accordance with any of aspects 15-21.

Aspect 24 is an apparatus for wireless communications, comprising means for performing a method in accordance with any of aspects 15-21.

Aspect 25 is the apparatus of aspect 23 or 24 further comprising a wireless communication device comprising at least one of a transceiver or an antenna coupled to the processor, wherein the processor is configured to transmit the second message via at least one of the transceiver or the antenna Aspect 26 is a computer-readable medium (e.g., a non-transitory computer-readable medium) comprising instructions that, when executed by a processor, cause the processor to perform a method in accordance with any of aspects 15-21.

What is claimed is:

1. An apparatus for wireless communication at a first vehicle-to- everything (V2X) device, comprising:
a memory; and
a processor coupled to the memory and, based on information stored in the memory, the processor is configured to:
obtain a message comprising a medium access control (MAC) header, a layer 1 (L1) source identifier (ID), and an L1 destination ID;
decode the MAC header to produce a layer 2 (L2) source ID associated with the message based on at least one of (1) the L1 destination ID of the message matching a first number of bits of an L2 source ID of the first V2X device or (2) the L1 source ID of the message matching a second number of bits of the L2 source ID of the first V2X device, wherein to decode the MAC header, the processor is configured to decode the MAC header further based on the L1 destination ID of the message matching a third number of bits of a provider service ID (PSID) associated with the first V2X device.; and output an indication of a MAC cloning attack based on the L2 source ID of the message matching the L2 source ID of the first V2X device.

2. The apparatus of claim 1, wherein the first V2X device is at least one of a vehicle, an ego vehicle, a user equipment (UE), a roadside unit (RSU), an on-board unit (OBU), or a network node.

3. The apparatus of claim 1, wherein to output the indication of the MAC cloning attack, the processor is configured to output the indication of the MAC cloning attack during a unicast session between the first V2X device and a second V2X device.

4. The apparatus of claim 1, wherein the processor is further configured to:

perform a temperature measurement of at least one of hardware of the first V2X device or an ambient environment around the first V2X device, wherein to decode the MAC header, the processor is configured to decode the MAC header based on the temperature measurement and a threshold temperature.

5. The apparatus of claim 4, wherein to decode the MAC header, the processor is configured to decode the MAC header if the temperature measurement is less than or equal to the threshold temperature.

6. The apparatus of claim 1, wherein the processor is further configured to:

receive a second message from a second V2X device, wherein to decode the MAC header, the processor is configured to decode the MAC header based on the reception of the second message.

7. The apparatus of claim 1, wherein the L1 destination ID of the message comprises sixteen bits, and wherein the first number of bits comprises sixteen least significant bits (LSBs) of the L2 source ID of the first V2X device.

8. The apparatus of claim 1, wherein the L1 source ID of the message comprises eight bits, and wherein the second number of bits comprises eight least significant bits (LSBs) of the L2 source ID of the first V2X device.

9. The apparatus of claim 1, wherein to output the indication of the MAC cloning attack, the processor is configured to transmit a second message to a second V2X device.

10. The apparatus of claim 1, wherein the apparatus is a wireless communication device comprising at least one of a transceiver or an antenna coupled to the processor, and wherein to obtain the message, the processor is configured to obtain the message via at least one of the transceiver or the antenna.

11. An apparatus for wireless communication at a first vehicle-to- everything (V2X) device, comprising:

a memory; and a processor coupled to the memory and, based on information stored in the memory, the processor is configured to:

detect that a medium access control (MAC) cloning attack has occurred based on a layer 1 (L1) destination identifier (ID) of a second V2X device, an L1 source ID of the first V2X device, and a layer 2 (L2) source ID of a first message; and transmit, for the second V2X device based on the detection, a second message that indicates a MAC cloning attack and that includes the L1 destination ID of the second V2X device, the L1 source ID of the first V2X device, and the L2 source ID of the first message, wherein the second message is associated with a plurality of messages from a plurality of V2X devices including the second V2X device, and wherein the plurality of messages is associated with a majority voting algorithm associated with an indication of the MAC cloning attack.

12. The apparatus of claim 11, wherein the second message includes an inter-user equipment (inter-UE) coordination message.

13. The apparatus of claim 12, wherein the L1 destination ID of the second V2X device, the L1 source ID of the first V2X device, and the L2 source ID of the first message are included in a MAC control element (MAC-CE) of the inter-UE coordination message.

14. The apparatus of claim 11, wherein the second message includes an application layer message.

15. The apparatus of claim 14, wherein the application layer message comprises at least one of a cooperative perception message (CPM) or a sensor data sharing message (SDSM).

16. The apparatus of claim 11, wherein to transmit the second message, the processor is configured to transmit the second message during at least one of a unicast session between the first V2X device and the second V2X device, a groupcast session between the first V2X device and the second V2X device, or a broadcast session associated with the first V2X device.

17. The apparatus of claim 11, wherein the first V2X device is at least one of a first vehicle, a first ego vehicle, a first user equipment (UE), a first roadside unit (RSU), a first on-board unit (OBU), or a first network node, and wherein the second V2X device is at least one of a second vehicle, a second ego vehicle, a second UE, a second RSU, a second OBU, or a second network node.

18. The apparatus of claim 11, wherein the apparatus is a wireless communication device comprising at least one of a transceiver or an antenna coupled to the processor, and wherein to transmit the second message, the processor is configured to transmit the second message via at least one of the transceiver or the antenna.

19. A method of wireless communication at a first vehicle-to-everything (V2X) device, comprising:

obtaining a message comprising a medium access control (MAC) header, a layer 1 (L1) source identifier (ID), and an L1 destination ID;

decoding the MAC header to produce a layer 2 (L2) source ID associated with the message based on at least one of (1) the L1 destination ID of the message matching a first number of bits of an L2 source ID of the first V2X device or (2) the L1 source ID of the message matching a second number of bits of the L2 source ID of the first V2X device, wherein decoding the MAC header comprises decoding the MAC header further based on the L1 destination ID of the message matching a third number of bits of a provider service ID (PSID) associated with the first V2X device; and outputting an indication of a MAC cloning attack based on the L2 source ID of the message matching the L2 source ID of the first V2X device.

20. The method of claim 19, wherein the first V2X device is at least one of a vehicle, an ego vehicle, a user equipment (UE), a roadside unit (RSU), an on-board unit (OBU), or a network node.

21. The method of claim 19, wherein outputting the indication of the MAC cloning attack occurs during a unicast session between the first V2X device and a second V2X device.

22. The method of claim 19, further comprising:
performing a temperature measurement of at least one of hardware of the first V2X device or an ambient environment around the first V2X device, wherein decoding the MAC header comprises decoding the MAC header based on the temperature measurement and a threshold temperature.

23. The method of claim 22, wherein decoding the MAC header comprises decoding the MAC header if the temperature measurement is less than or equal to the threshold temperature.

24. The method of claim 19, further comprising:
receiving a second message from a second V2X device, wherein decoding the MAC header comprises decoding the MAC header based on the reception of the second message.

25. The method of claim 19, wherein the L1 destination ID of the message comprises sixteen bits, and wherein the first number of bits comprises sixteen least significant bits (LSBs) of the L2 source ID of the first V2X device.

26. The method of claim 19, wherein the L1 source ID of the message comprises eight bits, and wherein the second number of bits comprises eight least significant bits (LSBs) of the L2 source ID of the first V2X device.

27. A method of wireless communication at a first vehicle-to-everything (V2X) device, comprising:

detecting that a medium access control (MAC) cloning attack has occurred based on a layer 1 (L1) destination identifier (ID) of a second V2X device, an L1 source ID of the first V2X device, and a layer 2 (L2) source ID of a first message; and transmitting, for the second V2X device based on the detection, a second message that indicates a MAC cloning attack and that includes the L1 destination ID of the second V2X device, the L1 source ID of the first V2X device, and the L2 source ID of the first message, wherein the second message is associated with a plurality of messages from a plurality of V2X devices including the second V2X device, and wherein the plurality of messages is associated with a majority voting algorithm associated with an indication of the MAC cloning attack.

28. The method of claim 27, wherein the second message includes an inter-user equipment (inter-UE) coordination message, and wherein the L1 destination ID of the second V2X device, the L1 source ID of the first V2X device, and the L2 source ID of the first message are included in a MAC control element (MAC-CE) of the inter-UE coordination message.

29. The method of claim 27, wherein transmitting the second message comprises transmitting the second message during at least one of a unicast session between the first V2X device and the second V2X device, a groupcast session between the first V2X device and the second V2X device, or a broadcast session associated with the first V2X device.

* * * * *